United States Patent
Bangerter et al.

(10) Patent No.: US 10,973,182 B1
(45) Date of Patent: Apr. 13, 2021

(54) WIRELESS SPRINKLER VALVE SYSTEM

(71) Applicant: Thrive Smart Systems Incorporated, American Fork, UT (US)

(72) Inventors: Seth Paulo Bangerter, American Fork, UT (US); Skyler Rowley, Lindon, UT (US); Bryan Christopher Brittain, Camas, WA (US); Gregory T. Parker, San Diego, CA (US); Grant Rowberry, Provo, UT (US)

(73) Assignee: Thrive Smart Systems Incorporated, American Fork, UT (US)

( * ) Notice: Subject to any disclaimer, the term of this patent is extended or adjusted under 35 U.S.C. 154(b) by 0 days.

(21) Appl. No.: 16/692,983

(22) Filed: Nov. 22, 2019

Related U.S. Application Data

(60) Provisional application No. 62/773,395, filed on Nov. 30, 2018, provisional application No. 62/902,827, filed on Sep. 19, 2019.

(51) Int. Cl.
*A01G 25/00* (2006.01)
*A01G 25/16* (2006.01)
*H04Q 9/02* (2006.01)
*G05D 7/06* (2006.01)
*G05B 15/02* (2006.01)

(52) U.S. Cl.
CPC .......... *A01G 25/165* (2013.01); *G05B 15/02* (2013.01); *G05D 7/0635* (2013.01); *H04Q 9/02* (2013.01); *G05B 2219/2625* (2013.01)

(58) Field of Classification Search
None
See application file for complete search history.

(56) References Cited

U.S. PATENT DOCUMENTS

| 4,838,310 A | * | 6/1989 | Scott ...................... A01G 25/16 137/624.14 |
| 10,352,840 B2 | | 7/2019 | Lafian |

(Continued)

OTHER PUBLICATIONS

Golf Irrigation Specification Catalog 2019, https://cdn2.toro.com/en/-/media/Files/Toro/Golf-Irrigation/Toro-Golf-Catalog-2019.ashx (p. 34), retrieved Nov. 21, 2019.

(Continued)

*Primary Examiner* — Paul B Yanchus, III
(74) *Attorney, Agent, or Firm* — Lowenstein Sandler LLP

(57) ABSTRACT

In some embodiments, a method includes receiving, by a wireless component of a wireless valve switch system via a wireless network, wireless instructions and causing, by the wireless component based on the wireless instructions, actuation of a sprinkler valve. In some embodiments, a wireless valve switch system includes a wireless component configured to be electrically coupled to a sprinkler valve. The wireless component includes a controller to receive, via a wireless network, wireless instructions and cause, based on the wireless instructions, actuation of the sprinkler valve. In some embodiments, a wireless valve switch system includes a turbine component that includes a casing forming a chamber configured to be fluidly coupled to a sprinkler valve. The turbine component further includes a turbine disposed in the chamber and configured to rotate responsive to fluid flow through the chamber to power an electrical component configured to be electrically coupled to the sprinkler valve.

15 Claims, 15 Drawing Sheets

(56) References Cited

U.S. PATENT DOCUMENTS

| | | | |
|---|---|---|---|
| 2008/0046131 A1 | 2/2008 | Sarver | |
| 2013/0173070 A1* | 7/2013 | Tennyson | G05B 19/02 |
| | | | 700/284 |
| 2017/0172078 A1* | 6/2017 | Gonzalez Hernandez | ............... |
| | | | H04W 4/80 |
| 2017/0307452 A1 | 10/2017 | Lafian | |
| 2019/0242355 A1* | 8/2019 | Kah, III | F03B 1/04 |
| 2020/0015438 A1* | 1/2020 | Klicpera | H04W 4/80 |
| 2020/0022322 A1 | 1/2020 | Lafian | |

OTHER PUBLICATIONS https://www.hunterindustries.com/irrigation-product/controllers/node, retrieved Nov. 21, 2019.
http://www.aivaka.com/index.html, retrieved Nov. 21, 2019.
https://aquaterr.net/system.html, retrieved Nov. 21, 2019.
http://www.anctech.com/ retrieved Nov. 21, 2019.
Mary Elizabeth Williams-Villano, "Taking wireless into uncharted waters" https://igin.com/article-7160-Taking-wireless-into-uncharted-waters.html, retrieved Apr. 7, 2020.
Jesse Lafian, "Horticulture student wins UGA's Next Top Entrepreneur competition" Jul. 6, 2017 Nursery Management, https://www.nurserymag.com/article/hort-student-wins-uga-next-top-entrepreneur/.
Wireless irrigation, redefined. https://www.reservoirusa.com/ retrieved Apr. 7, 2020.
Wireless Valve Control, https://tucor.com/wireless-valve-control.html, retrieved Apr. 7, 2020.
Phantom Wires Inc., How it Works, https://www.phantomwires.com/phantom-transponder, retrieved Apr. 7, 2020.
Phantom Wires Inc., https://www.phantomwires.com/, retrieved Apr. 7, 2020.
http://m.nelsonirrigation.com/twig-wireless-control-system.html, retrieved May 20, 2020.
http://m.nelsonirrigation.com/twig.html, retrieved May 20, 2020.
http://m.nelsonirrigation.com/td2000-controller.html, retrieved May 20, 2020.

* cited by examiner

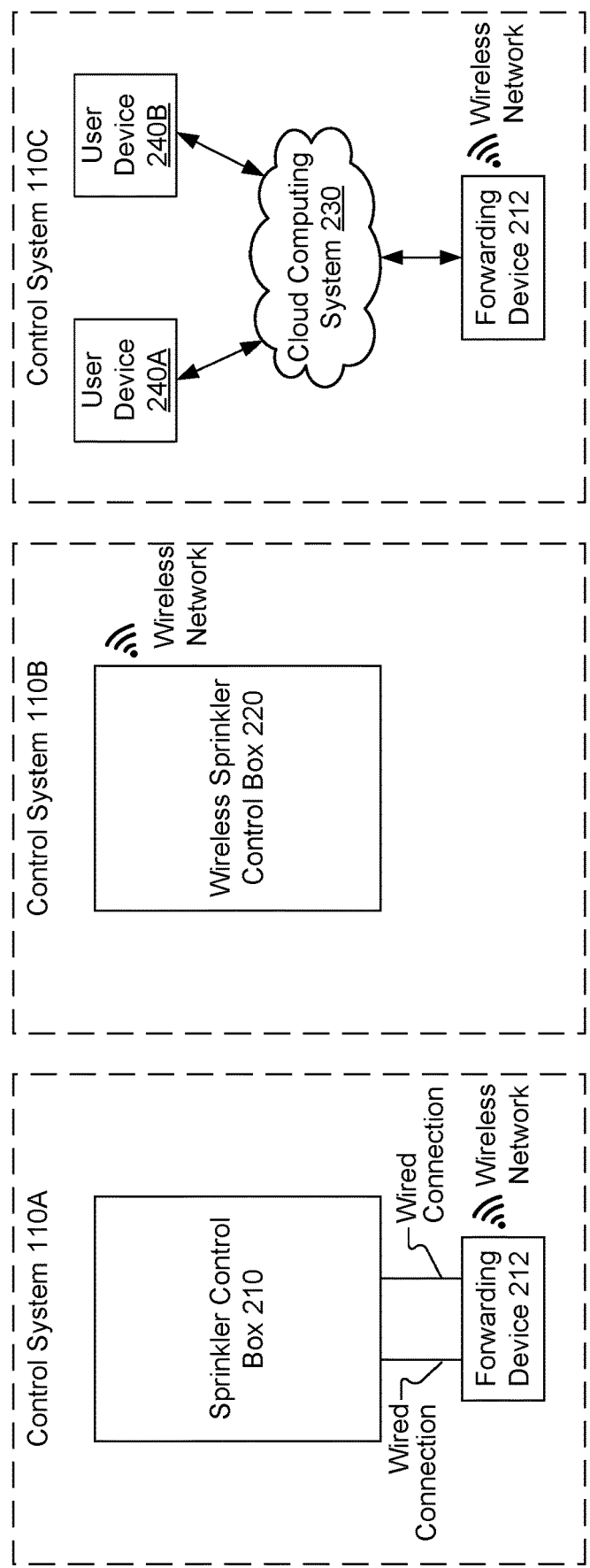

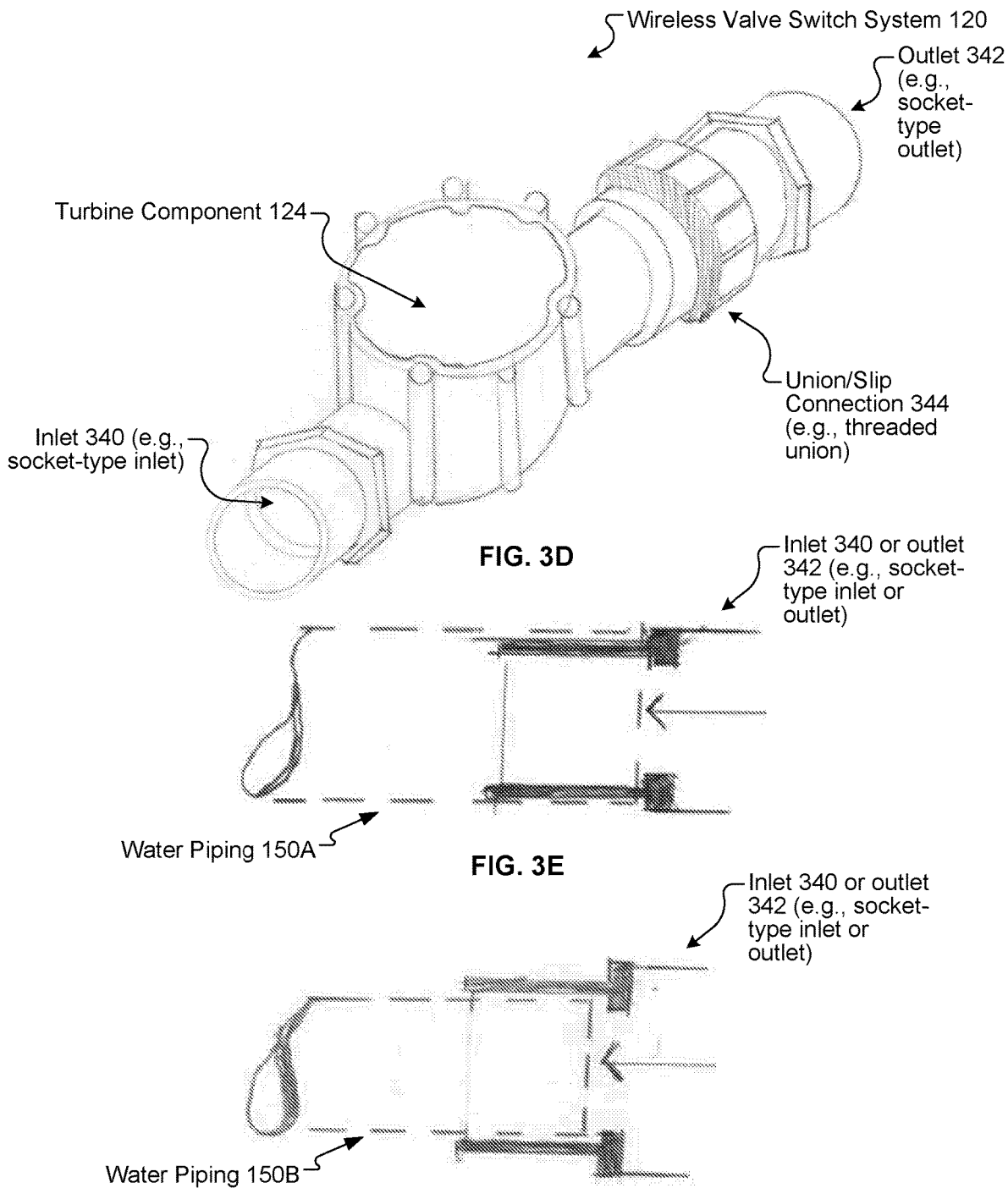

WIRELESS SPRINKLER VALVE SYSTEM

RELATED APPLICATION

This application claims the benefit of U.S. Provisional Application No. 62/773,395, filed Nov. 30, 2018, and U.S. Provisional Application No. 62/902,827, filed Sep. 19, 2019, the contents of which are hereby incorporated by reference in their entirety.

BACKGROUND

Sprinkler systems are often used by homeowners, farmers, public entities, businesses, etc. to provide liquid flow to different areas (e.g., for irrigation of lawns and gardens, for irrigation of farms and parks, for cooling, for control of airborne dust, for fire suppression, etc.). In one example, buried systems allow water to be distributed to sprinkler heads distributed throughout an area to be watered. In many systems, electronic valves are used to control the flow of water to the sprinkler system. There is generally a wire path between the electronic valves and a control device as part of these systems.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, by a wireless component of a wireless valve switch system via a wireless network, wireless instructions. The method further includes causing, by the wireless component based on the wireless instructions, actuation of a sprinkler valve.

In another aspect of the disclosure, a wireless valve switch system includes a wireless component configured to be electrically coupled to a sprinkler valve. The wireless component includes computer-readable media and a controller coupled to the computer-readable media. The controller is to receive, via a wireless network, wireless instructions and cause, based on the wireless instructions, actuation of the sprinkler valve.

In another aspect of the disclosure, a wireless valve switch system includes a turbine component. The turbine component includes a casing forming a chamber configured to be fluidly coupled to a sprinkler valve. The turbine component further includes a turbine disposed in the chamber. The turbine is configured to rotate responsive to fluid flow through the chamber to power one or more electrical components that are configured to be electrically coupled to the sprinkler valve. At least one of the one or more electrical components is configured to cause actuation of the sprinkler valve.

DESCRIPTION OF DRAWINGS

The figures depict certain embodiments of the present disclosure. These embodiments illustrated should not be seen as limiting the present disclosure and further embodiments which vary from the illustrated embodiments are described in the detailed description.

FIGS. 2A-D illustrate control systems for wireless sprinkler valve systems, according to certain embodiments.

FIG. 3D illustrates a turbine component of a wireless valve switch system, according to certain embodiments.

FIGS. 3E-F illustrate portions of a turbine component of a wireless valve switch system, according to certain embodiments.

DETAILED DESCRIPTION

Figure 1A:
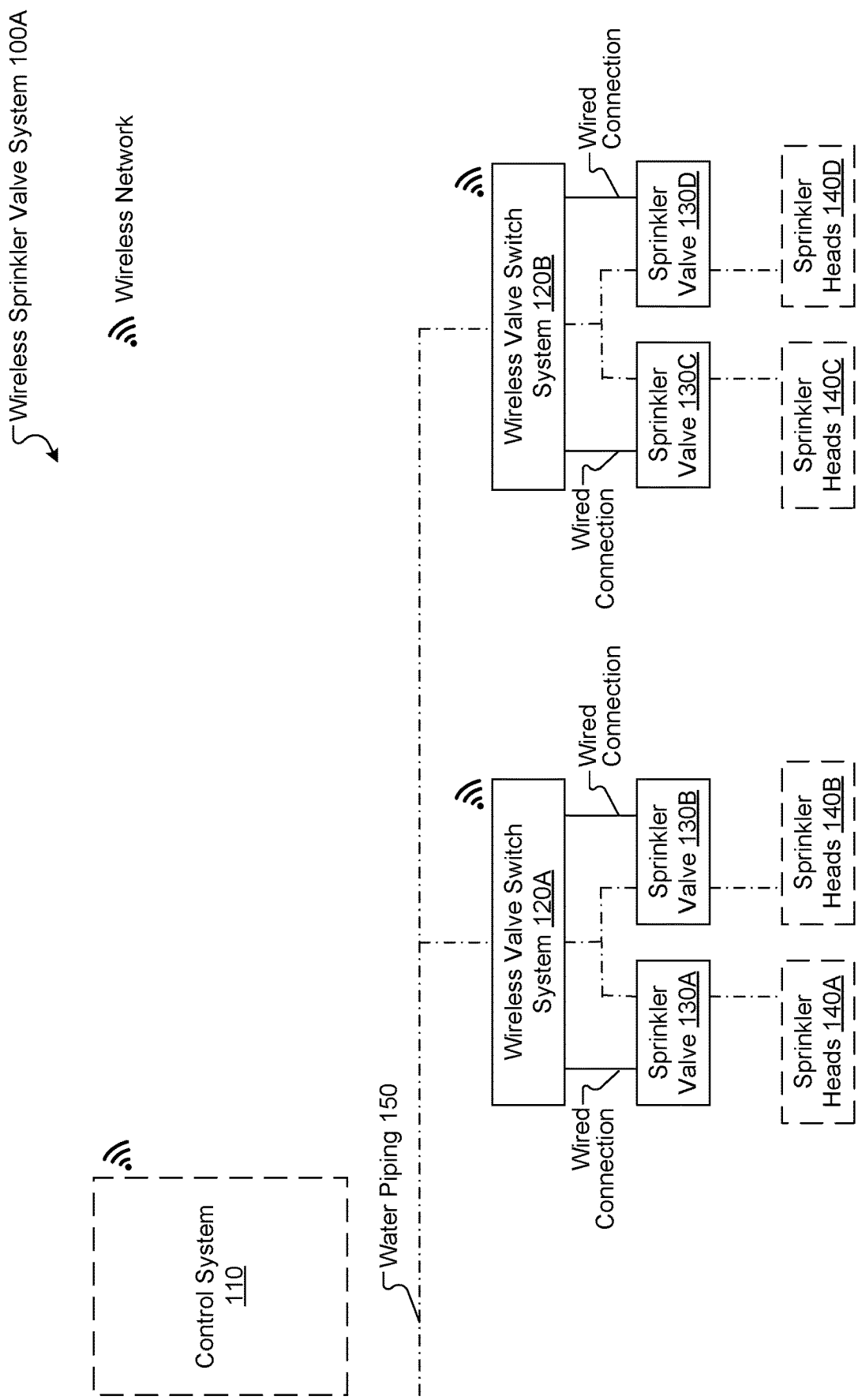
FIGS. 1A-B illustrate wireless sprinkler valve systems, according to certain embodiments.

Disclosed herein are technologies related to a wireless sprinkler valve system. The wireless sprinkler valve system may include a wireless valve switch system (e.g., a wireless valve switch device that includes integrated pressure and flow sensors). Sprinklers (e.g., water sprinklers, irrigation sprinklers, etc.) may be used to provide media (e.g., liquid, vapor, water) to an area. Sprinkler systems include valves to control fluid flow to different areas and/or sprinklers with integrated electric valves. For example, sprinkler systems may be used to irrigate agricultural crops, lawns, gardens, landscapes, golf courses, and other areas. In another example, sprinkler systems may be used for fire suppression in buildings. Sprinklers may be used for cooling (e.g., mist systems, etc.) and for the control of airborne dust. Sprinklers may apply media in a controlled manner similar to rainfall or mist. Sprinklers may be used for residential, industrial, public land, and agricultural usage.

Some conventional sprinkler systems are manually controlled. Control of manual sprinkler systems may include placing a sprinkler device, manually opening a valve (e.g., to allow flow of media through the sprinkler device), waiting an amount of time, manually closing the valve, moving the sprinkler device, and repeating the process. Manual control may occur on a regular basis (e.g., hourly, daily, weekly, etc.). Manually-controlled sprinkler systems are very time consuming and error-prone. For example, forgetting to manually water may cause the area to not receive enough water and forgetting to manually close the valve may cause the area to receive too much water.

Other conventional sprinkler systems include electronic valves connected to a control box (e.g., control box located in a remote location) via electrical wiring. The electrical wiring provides power and switching instructions to the sprinkler valves (e.g., to control switching functions such as to open and close valves). The electrical wiring increases the cost and difficulty of installation and maintenance of sprinkler systems. Installation of the electrical wiring may include removing ground covering (e.g., cutting concrete, cutting asphalt, cutting pavement, removing bricks and/or pavers, removing gravel, removing vegetation, or the like) and digging trenches (e.g., while avoiding cutting piping, conduits, roots, or the like) from each of the electronic valves back to the control box, laying the electrical wiring in the trenches, filling the trenches, and repairing the ground covering (e.g., re-pouring concrete, repairing pavement, planting vegetation, or the like). If electrical wiring malfunctions (e.g., is cut causing an orphaned electronic valve), the ground covering is to be re-removed, trenches are to be re-dug, and the process is to be performed over again. If a new electronic valve is to be installed (e.g., to service a new sprinkler zone), ground covering is to be removed, trenches are to be dug, and the process is to be performed for the new electronic valve. Wired electronic valves have a high cost of the electrical wiring, are time consuming to install and maintain, and disturb the surrounding areas via installation and maintenance (e.g., via trenching and cutting concrete). In some conventional sprinkler systems, devices (e.g., flow sensing device, pressure sensing device, soil moisture sensing device, or the like) also have a wire path back to the control system. Installation and maintenance of electrical wiring for these devices is costly, time-consuming, and disruptive.

Other conventional sprinkler systems include electronic valves that each have a distinct timer (e.g., programmable timer) that is individually programmed and that is powered by a corresponding battery (e.g., disposable battery, non-disposable battery). The batteries and manual programmable timers may be used to provide power and switching instructions to the valves. These battery-operated devices maybe used on a temporary basis to sustain a landscape during critical environmental conditions or may be applied for more permanent applications when the existing wire path has failed for any number of reasons. Periodic replacement of batteries and manual programming of each valve also increases the cost and difficulty of installation and maintenance of sprinkler systems. Each of the timers is to be individually manually configured each time a new watering schedule is to be implemented and each time there is to be a deviation from the watering schedule (e.g., due to rainfall, an event, change of seasons, etc.). Regular configuration of each timer and replacement of each battery (e.g., once a season) is time consuming, error prone, and expensive. Some areas (e.g., golf courses or other large areas to be watered) may not be able to be completed controlled via battery-powered timers and electrical wiring may still be ran due to maintenance difficulties (e.g., replacing batteries for and reprogramming a large number of battery-powered timers may be impractical for golf courses or other large areas to be watered).

Conventional sprinkler systems may have limited locations where electronic valves may be installed due to control box location, constructed boundaries (e.g., roads, property lines, pathways, or the like), natural boundaries (e.g., body of water, vegetation, etc.), or the like. The limited locations may be proximate locations that could disrupt functionality of the electronic valves. Locations that could disrupt functionality of the electronic valves may include one or more of high-vibration locations (e.g., proximate a road, proximate passing vehicles, proximate machinery, or the like), locations of high amounts of water, locations of high traffic (e.g., by people, animals, vehicles, or the like), etc. Electronic valves in conventional systems may be subject to disrupted functionality, damage, or the like due to the limited locations where the electronic valves may be installed.

The devices and systems disclosed herein provide a wireless sprinkler valve system (e.g., that includes a wireless valve switch system that includes integrated pressure and flow sensors). A wireless sprinkler valve system may include a sprinkler valve and a wireless valve switch system. The sprinkler valve has a valve and a valve switch device (e.g., solenoid device) that actuates the valve. The wireless valve switch system is configured to one or more of electrically, physically, and/or fluidly couple to the sprinkler valve. In some embodiments, the wireless valve switch system includes a wireless component and/or a turbine component.

In some embodiments, the wireless component is configured to be electrically coupled to a sprinkler valve (e.g., via a wired connection). The wireless component includes computer-readable media (e.g., memory) and a controller (e.g., processing device) coupled to the computer-readable media. The controller is to receive, via a wireless network, wireless instructions (e.g., from a control system) and cause, based on the wireless instructions, actuation of the sprinkler valve.

In some embodiments, the turbine component includes a casing forming a chamber configured to be fluidly coupled to a sprinkler valve (e.g., via water piping). The turbine component further includes a turbine (e.g., fan blades) disposed in the chamber. The turbine is configured to rotate responsive to fluid flow through the chamber to power one or more electrical components (e.g., the wireless component, controller, etc.) that are configured to be electrically coupled to the sprinkler valve. At least one of the one or more electrical components is configured to cause actuation of the sprinkler valve.

In some embodiments, the wireless component and the turbine component are separate components (e.g., not within the same housing) and are electrically coupled (e.g., via a wired connection, via electrical wiring).

In some embodiments, the wireless component and the turbine component are disposed within the same housing (e.g., are part of a wireless valve switch device). The wireless valve switch system (e.g., turbine component, wireless valve switch device) has a casing with an inlet and an outlet. The casing forms a chamber to house a turbine configured to charge (e.g., responsive to rotation of the turbine, responsive to fluid flow through the chamber) a power storage device (e.g., located in the wireless component, located in the wireless valve switch device, etc.). The wireless valve switch system (e.g., wireless component, wireless valve switch device) also has a wireless module to receive a wireless signal that contains valving instructions and has a processing device to execute the valving instructions to transfer power from the power storage device to the sprinkler valve to open or close the valve using the valve switch based on the valving instructions. The wireless valve switch system (e.g., wireless component, wireless valve switch device) also has computer-readable storage (e.g., memory) to store the valving instructions.

The present disclosure provides a wireless valve switch system (e.g., wireless component, wireless valve switch device) that receives valving instructions wirelessly (e.g., receives valving instructions without electrical wiring). In some embodiments, the wireless valve switch system operates without regular battery replacement (e.g., battery replacement is less often than conventional systems that use batteries). The present disclosure has the advantage of providing a sprinkler system that has one or more sprinkler valves that are remotely and centrally controlled without underground wiring from the control system to the valve box. The present disclosure has the advantage of a sprinkler system that has one or more sprinkler valves that are remotely and centrally controlled without manually accessing the valve box to change the timer programming. In some embodiments, the present disclosure has the advantage of providing a wireless sprinkler valve system that operates without regularly accessing the wireless valve switch device to replace dead batteries. The present disclosure may have the advantage of providing wireless valve switch systems (e.g., wireless valve switch devices) and sprinkler valves in locations that would not disrupt functionality of the wireless valve switch systems (e.g., wireless valve switch devices) and sprinkler valves (e.g., away from high-vibration locations, etc.).

In some embodiments, the wireless sprinkler valve system uses a rechargeable battery and a water-powered turbine for recharging the battery using the flow of water through the valve (e.g., reducing the frequency of replacing batteries or eliminating battery replacement). In some embodiments, the rechargeable battery of the wireless valve switch device is to be replaced once every three or more seasons (e.g., three or more years).

The wireless valve switch system (e.g., turbine component, wireless valve switch device) may include a turbine, or fan blades that substantially match the pipe diameter of existing sprinkler systems and maintain the pressure necessary for proper sprinkler head activation (e.g., minimize pressure drop). The wireless valve switch system (e.g., wireless component, wireless valve switch device) may enable pressure and flow sensing that can be used to automatically detect leaks in the system. The pressure and flow sensors can also be utilized by government municipalities to monitor water usage without the use of a meter at the house. The wireless capability can also allow such municipalities to remotely access water usage data without manually accessing the sensors.

It may be noted that a wireless sprinkler valve system being used to provide water flow is for purposes of illustration, rather than limitation. In other implementations, the wireless sprinkler valve system may provide other types of media flow (e.g., liquid, gas, vapor, fire suppression media, etc.) for example. It may be further noted that the disclosure describes using the wireless sprinkler valve system for irrigation is for purposes of illustration, rather than limitation. Aspects of the present disclosure may be applied to sprinkler valve systems generally. For example, aspects of the present disclosure may be applied to a wireless sprinkler system for fire suppression, cooling, control of airborne dust, etc.

Figure 1B:
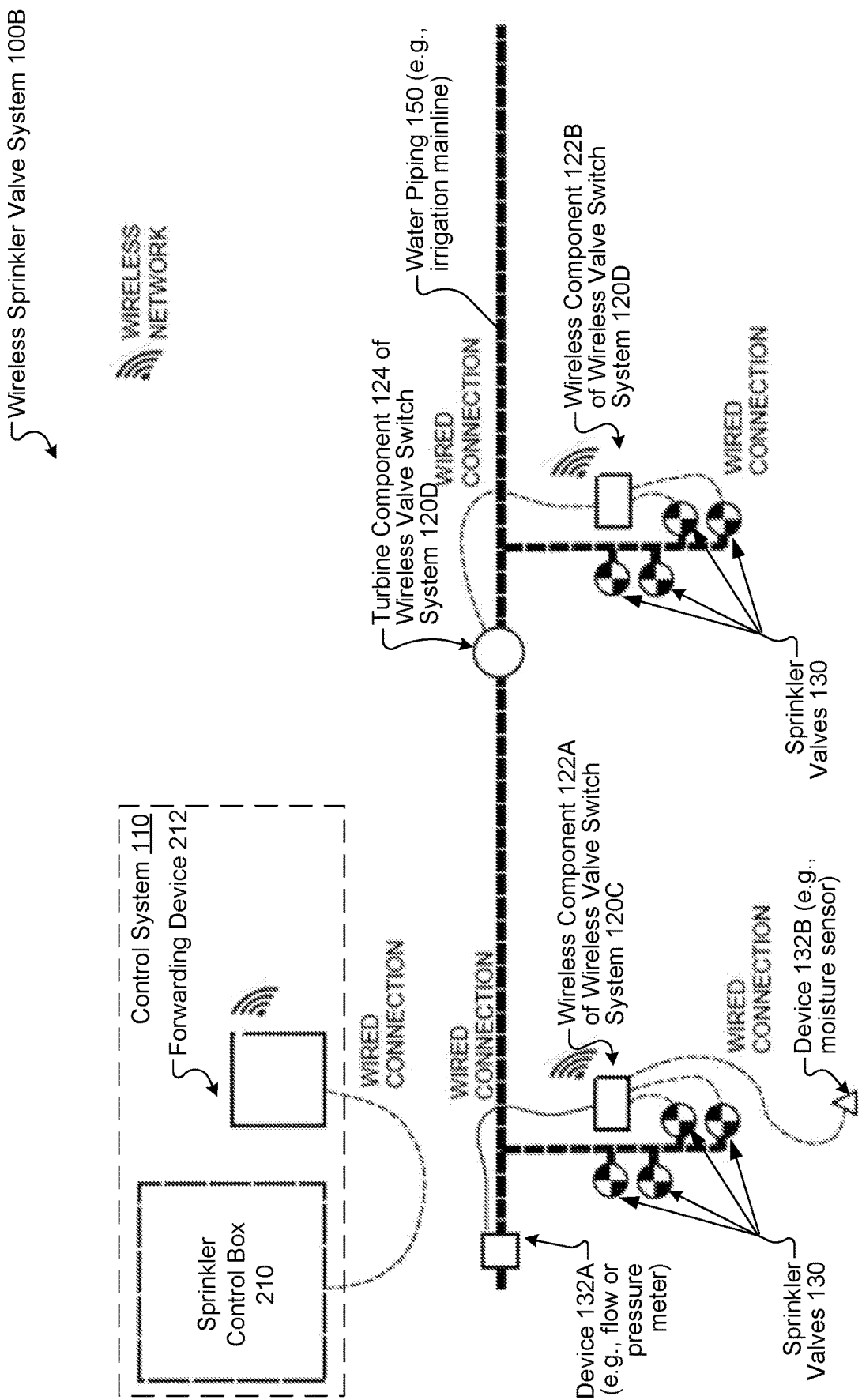

FIGS. 1A-B illustrate wireless sprinkler valve systems 100A-B, according to certain embodiments. Elements with common numbering between FIGS. 1A-B may have similar functionality and/or properties.

The wireless sprinkler valve system 100 may include a control system 110 (e.g., that includes a forwarding device 212 (see FIGS. 2A-C), also referred to as "forwarder"), one or more wireless valve switch systems 120 (e.g., wireless valve switch device, receiving device, also referred to as "receiver"), one or more sprinkler valves 130, and one or more sprinkler heads 140. As described herein, the operations of the control system 110 may be performed by one or more of control system 110, sprinkler control box 210, forwarding device 212, wireless sprinkler control box 220, user device 240, or cloud computing system 230 (e.g., see FIGS. 2A-C).

In the present disclosure, the wireless valve switch system 120 may be referred to as a wireless valve switch system, a wireless valve switch device, a wireless valve switch assembly, a wireless valve switch, or the like. In some embodiments, the wireless valve switch system 120 includes a single housing (e.g., casing) and the components of the wireless valve switch system 120 are included within the single housing. In some embodiments, the wireless valve switch system 120 includes separate components that are remote from each other and coupled via wired connections (e.g., electrical wiring). For example, components of the wireless valve switch system may be disposed within or proximate the same valve box (e.g., valve box 310 of FIG. 3B).

The wireless valve switch system 120 may include a wireless component 122 and/or a turbine component 124. The wireless component 122 may include one or more electrical components (e.g., processing device 514, memory 518, wireless module 512, power storage device 516 (e.g., energy storage device, battery, rechargeable battery, disposable battery, etc.), antenna 330, controller, computer readable media, wireless transmitter/receiver, power storage, etc.). The turbine component 124 may include the turbine (e.g., fan blades 118). The wireless component 122 may receive signals from and transmit signals to the control system 110, sprinkler valves 130, and other devices (e.g., moisture sensor, pressure sensor, flow sensor, etc.). The turbine component 124 may power the wireless component 122.

In some embodiments, the wireless valve switch system 120 includes a wireless component 122 and a turbine component 124 that are disposed within the same housing. In some embodiments, the wireless valve switch system 120 includes a wireless component 122 and a turbine component 124 that are remote from each other (e.g., are separate components, the wireless component 122 has a first housing and the turbine component has a second housing) and that are electrically coupled (e.g., see wireless valve switch system 120D of FIG. 1B and see wireless valve switch system 120 of FIG. 3B). In some embodiments, the wireless valve switch system 120 includes a wireless component 122 and does not include a turbine component 124 (e.g., the wireless component 122 is battery powered).

In some embodiments, one or more components of the wireless valve switch system 120 and a sprinkler valve 130 are combined (e.g., a single unit could include a turbine and a sprinkler valve, a single unit includes the wireless component 122 and the sprinkler valve 130). In some embodiments, a sprinkler valve 130 and a sprinkler head 140 are combined (e.g., the sprinkler head 140 includes a sprinkler valve 130, the sprinkler valve 130 is an integral part of the sprinkler head 140). In some embodiments, a sprinkler valve 130, a sprinkler head 140, and one or more components of the wireless valve switch system 120 are combined.

A sprinkler valve 130 may be an electrically actuated irrigation remote control valve with integrated solenoid. In some embodiments, a sprinkler valve 130 may be pressure regulating valves that are electrically actuated. A sprinkler valve 130 may be an electromechanical device (e.g., electrical valve) that includes a solenoid (e.g., switch 520). The electrical valve may be actuated using the solenoid of a voltage including one or more of 220 Volts (V), 120 V, 24 Volts alternating current (VAC), or 12 Volts direct current (VDC). Water piping 150 (e.g., new or existing pressurized irrigation mainline system) may be routed from a water supply (e.g., municipal water line, main shut off valve, etc.) to each wireless valve switch system 120. Similarly, one or more other devices 132 (e.g., a flow sensor, pressure sensor, moisture sensor, master valve, or the like) may also be electrically actuated (e.g., via the wireless valve switch system 120). A sprinkler valve 130 and/or other device 132 may transmit sensor data (e.g., valve actuation data, pressure data, flow data, temperature data, moisture data, or the like) to the wireless valve switch system 120 (e.g., wireless component 122) and the wireless valve switch system 120 may transmit the sensor data via a wireless signal to control system 110 (sprinkler control box, forwarding device, flow monitor, or the like). In some embodiments, responsive to determining programmed flow parameters (e.g., amount of time of watering, total quantity of water provided, flow rate, pressure, moisture level, etc.) are exceeded, the control system 110 (e.g., irrigation controller or flow monitor) can cause a message to be transmitted wirelessly (e.g., to the wireless valve switch system 120) to cause a sprinkler valve 130 (e.g., the master valve) to be actuated to a closed position.

The wireless valve switch system 120 may be associated with new or existing piping 150 (e.g., the turbine component 124 may be fluidly coupled to new or existing piping 150). The wireless valve switch system 120 (e.g., turbine component 124) may generate power when fluid is flowing through the piping 150. Water piping 150 may be routed from each wireless valve switch system 120 (e.g., turbine component 124) to one or more sprinkler valves 130. Water piping 150 may be routed from each sprinkler valve 130 to one or more sprinkler heads 140. The wireless valve switch system 120 (e.g., turbine component 124), corresponding sprinkler valves 130, and corresponding sprinkler heads 140 may be fluidly coupled.

In some embodiments, the wireless valve switch system 120 (e.g., wireless component 122) is battery-operated and located within a valve box of a new sprinkler valve 130 or existing sprinkler valve 130. In some embodiments, the wireless valve switch system 120 (e.g., wireless component 122) is powered by turbine component 124. The present disclosure provides for at least two methodologies (e.g., battery-powered and turbine component 124-powered) of providing power to the wireless valve switch system 120 (e.g., wireless component 122) to receive and transmit messages and to cause sprinkler valves 130 to electrically actuate.

In an example, a wireless sprinkler valve system 100 may include a wireless valve switch system 120A (e.g., wireless valve switch device, integral wireless component 122 and turbine component 124, remote and electrically coupled wireless component 122 and turbine component 124, wireless component 122 without a turbine component 124, etc.) for a first area (e.g., front yard) and a wireless valve switch system 120B (e.g., similar to or different from wireless valve switch system 120A) for a second area (e.g., backyard). The wireless valve switch system 120A may provide water flow to sprinkler valves 130A-B. Sprinkler valve 130A may controllably provide (e.g., by closing and opening) water flow to sprinkler heads 140A for a first zone (e.g., a first section of the front yard). Sprinkler valve 130B may controllably provide (e.g., by closing and opening) water flow to sprinkler heads 140B for a second zone (e.g., a second section of the front yard). The wireless valve switch system 120B may provide water flow to sprinkler valves 130C-D. Sprinkler valve 130C may controllably provide (e.g., by closing and opening) water flow to sprinkler heads 140C for a third zone (e.g., a first section of the backyard). Sprinkler valve 130D may controllably provide (e.g., by closing and opening) water flow to sprinkler heads 140D for a fourth zone (e.g., a second section of the backyard).

The control system 110 and wireless valve switch systems 120 (e.g., wireless components 122, wireless valve switch devices) may communicate using hardware and a communication protocols, such as Bluetooth®, Wi-Fi®, a long-range wireless communication protocol (e.g., Long Range (LoRa)), or similar wireless technologies and standards. In some embodiments, the control system 110 and wireless valve switch systems 120 include a long range, low power wireless chipset (e.g., for providing a spread spectrum modulation technique derived from chirp spread spectrum (CSS) technology). In some embodiments, the control system 110 and wireless valve switch system 120 may transmit signals and receive signals up to half a mile, up to one mile, or another distance. The control system 110 may include a processing device, a display, memory, etc. The processing device of the control system 110 may receive user input via the display of the control system 110, generate schedules (e.g., of valving instructions) based on the user input, store the schedules in memory of the control system 110, retrieve the schedules from the memory, and control the sprinkler valves based on the schedules.

The control system 110 may provide instructions via a wireless network to the wireless valve switch systems 120A-B (e.g., without electrical wiring coupling the control system 110 to the wireless valve switch systems 120A-B). Each wireless valve switch system 120 may control one or more sprinkler valves 130 by sending the instructions to the one or more sprinkler valves 130 via a wired connection or to the one or more sprinkler heads 140 via a wired connection (e.g., sprinkler head 140 includes an integral sprinkler valve 130). The wireless valve switch system 120 and corresponding sprinkler valves 130 may be located proximate each other (e.g., in the same valve box) to minimize the length of wiring between the wireless valve switch system 120 and corresponding sprinkler valves 130. In some embodiments, the wireless valve switch system 120 and/or control system 110 may communicate with (e.g., send instructions to) the corresponding sprinkler valves 130 wirelessly (e.g., via a wireless connection, via wireless network). In some embodiments, the wireless valve switch systems 120A may relay signals. For example, the control system 110 may transmit a signal (e.g., valving instructions for wireless valve switch system 120B) to wireless valve switch system 120A and the wireless valve switch system 120A may transmit (e.g., relay) the signal to the wireless valve switch system 120B.

In some embodiments, the wireless sprinkler valve system 100 may provide for wireless transmission of instructions (e.g., packets, data, signals, etc.) between the control system 110 (e.g., forwarding device 212, forwarder) and the wireless valve switch system 120 (e.g., receiving device, receiver). In some embodiments, a maximum of 10-25% percent of packets may be lost at a maximum range. In some embodiments, the control system 110 and/or wireless valve switch system 120 may have about zero to five seconds of response time). In some embodiments, a processing device (e.g., microcontroller) of the wireless valve switch system 120 may be in an off position (e.g., sleep position, not transmitting or receiving instructions) for 50-90% of the time (e.g., to provide for power savings). In some embodiments, the wireless sprinkler valve system 100 may use an encryption protocol (e.g., advance encryption standard (AES) security) for transmission of instructions between the control system 110 and the wireless valve switch system 120. In some embodiments, pairing between the control system 110 and the wireless valve switch system 120 may take about 1 to 25 seconds (e.g., for each sprinkler valve 130). In some embodiments, the wireless sprinkler valve system 100 may use encrypted wireless communication between the control system 110 and the wireless valve switch system 120 (e.g., a key exchange, securely exchanging cryptographic keys over a public channel, public-key exchange, Diffie-Hellman (DH) key exchange, or the like).

The control system 110 may include a sprinkler control box 210 and a forwarding device 212. In some embodiments, the control system 110 (e.g., forwarding device 212, forwarder) may receive power input. In some embodiments, a forwarding device 212 may have a dedicated power source (e.g., be receive power from an outlet, receive power from a 120 V wall plug in). In some embodiments, the forwarding device 212 may receive power from a sprinkler control box 210. The forwarding device 212 may be compatible with existing sprinkler control boxes 210. In some embodiments, the control system 110 may receive power input of about of about 3.3 volts. The forwarding device 212 may receive the wires that would normally be routed from the sprinkler control box 210 directly to the sprinkler valves 130. The wires coming from the sprinkler control box 210 may be secured to the forwarding device 212 via screw wire clamps (e.g., each wire may have a corresponding screw wire clamp). The forwarding device 212 may be mounted on a surface (e.g., a wall) proximate the sprinkler control box 210. Each wired connection between the sprinkler control box 210 and the forwarding device 212 may carry 24 V AC. In some embodiments, the wired connection between the wireless valve switch system 120 and the sprinkler valve 130 may carry 24 V AC.

The control system 110 may cause one or more wireless valve switch systems 120 (e.g., wireless component 122) to control stations (e.g., sprinkler valves 130). The control system 110 may cause control of sprinkler valves 130 (e.g., 1-24 sprinkler valves, up to 250 sprinkler valves 130, 120 sprinkler valves 130 or more, etc.) via one or more wireless valve switch systems 120. The control system 110 may communicate with multiple wireless valve switch systems 120 (e.g., up to twenty-four wireless valve switch systems 120, up to twenty-four wireless components 122).

The control system 110 (e.g., forwarding device 212) may pair with, transmit instructions to, and receive instructions from the wireless valve switch system 120 (e.g., wireless component 122). The control system 110 may send signals (e.g., instructions) wirelessly one or more of through buildings, through direct line of sight, underground in a valve box, while submerged in water, or the like over a specified distance. The control system 110 and wireless valve switch system 120 may transmit instructions (e.g., secure signals regarding each of the sprinkler valves) to each other over a distance (e.g., wireless distance) of 660 to 6000 feet (e.g., about 2000 feet) between each other. This distance may be increased with the use a wireless network repeating device (e.g., a battery-operated or generator-operated repeater). The control system 110 (e.g., forwarding device 212) may communicate with the wired valve switch system 120 (e.g., communicate every two seconds), receiving and confirming when a sprinkler valve 130 is on and off.

The control system 110 may perform one or more pairing functions (e.g., exchange of keys) with a wireless valve switch system 120 (e.g., wireless component 122), where each pairing function (e.g., key exchange) corresponds to a respective sprinkler valve 130. For example, a control system 110 may exchange a first set of keys with a wireless valve switch system 120A for control of a sprinkler valve 130A and the control system 110 may exchange a second set of keys with a wireless valve switch system 120A for control of a sprinkler valve 130B. In some embodiments, each wireless valve switch system 120 controls a single sprinkler valve (e.g., the control system 110 performs a corresponding key exchange with multiple wireless valve switch systems 120 (such as about 1-5, 1-10, up to twenty-four, up to 100, etc. wireless valve switch systems 120, where each key exchange corresponds to the single sprinkler valve 130 paired to the corresponding wireless valve switch system 120). In some embodiments, each wireless valve switch system 120 controls multiple sprinkler valves 130 (e.g., the control system 110 performs multiple key exchanges with each wireless valve switch system 120 to control up to twenty-four sprinkler valves 130, such as four wireless valve switch systems 120 that are each coupled to six respective sprinkler valves 130). In some embodiments, the control system 110 exchanges a first set of keys with the wireless valve switch system 120 to control multiple sprinkler valves 130 (e.g., bridging).

The control system 110 may have one or more user interfaces that indicates whether the control system 110 is one or more of sending instructions, receiving instructions, is pairing, is paired, is reset, is communicating, is not communicating, or the like. The user interface may include one or more of a light emitting diode (LED), graphical user interface (GUI), button, dial, communication (e.g., via Bluetooth) with an application executing on a mobile device, or the like. In some embodiments, the user interface may include a LED that is used for pairing and/or running. The LED may be different colors and/or different pulsations (e.g., solid, blinking) to indicate different stages and/or different functions (e.g., attempting to pair, paired, error, transmitting, receiving, no communication, or the like).

For troubleshooting and to show that the control system 110 is communicating with the wireless valve switch system 120 (e.g., wireless component 122), the control system 110 (e.g., forwarding device 212) may have a user interface (e.g., LED) that indicates when the control system 110 is attempting to pair with the wireless valve switch system 120 (e.g., blinking LED). Once pairing is complete and a station (e.g., sprinkler valve 130) is watering, the user interface (e.g., LED) may indicate the control system 110 is communicating with the wireless valve switch system 120 (e.g., LED remains lit). The user interface may indicate if communication is lost (e.g., LED turns off).

The user interface of the control system 110 (e.g., forwarding device 212) may have a number of positions (e.g., one for each sprinkler valve 130, one for pairing, one for resetting, one position for each sprinkler valve 130 the control system 110 can control, or the like). For example, the control system 110 may have a dial that can be turned and remain at one of twenty-five positions, until moved to the next position. The positions may be labeled 1-24 and run. First positions (e.g., positions 1-24) may correspond to connected sprinkler valves 130 (e.g., twenty-four sprinkler valves 130). The run position may be used when everything is paired and the control system 110 is ready to operate. In some embodiments, the user interface has a power button to turn incoming power (e.g., for the control system, for the wireless valve switch system 120) off temporarily or for over-wintering.

In some embodiments, the dial may be turned to a desired station on the control system 110 and then a dial may be turned to a desired station on the wireless valve switch system 120 (e.g., wireless component 122). After the two dials are turned to the desired stations, a pairing button on the control system 110 and a pairing button on the wireless valve switch system 120 may be simultaneously pressed.

The LEDs on the control system 110 and the wireless valve switch system 120 that correspond with the pairing buttons may blink, indicating that at attempt to pair a station is being made. Once successful pairing has taken place (e.g., keys have been exchanged between the control system 110 and the wireless valve switch system 120 for a sprinkler valve 130), the LEDs on the control system 110 and the wireless valve switch system 120 may turn solid (e.g., stop blinking). The pairing buttons may then be decompressed. The dials on the control system 110 and wireless valve switch system 120 may then be turned to the next station to repeat the process. In some embodiments, the pairing may be performed via a different type of user interface (e.g., instead of a dial) such as a GUI, buttons, an application executing on a mobile device that is in communication with the control system 110 and/or wireless valve switch system 120, or the like.

The wireless valve switch system 120 (e.g., turbine component 124) may include an impeller (e.g., turbine) that turns responsive to liquid flow through the wireless valve switch system 120 (e.g., through the chamber formed by the casing of the turbine component 124). A magnetic field may be created responsive to the spinning of the impeller. The wireless valve switch system 120 (e.g., turbine component 124) may include a coil (e.g., magnetic stator coil) that harnesses the power from the magnetic field generated by the spinning impeller. The wireless valve switch system 120 (e.g., wireless component 122) may include a PCB that receives the power from the coil (e.g., via a wired connection) and that manages the power (e.g., boosts up or down). The wireless valve switch system 120 (e.g., wireless component 122) may include a battery that receives the managed power from the PCB (e.g., the battery is charged or recharged). The wireless valve switch system 120 (e.g., wireless component 122) may include a processing device (e.g., microcontroller of the PCB) that may cause the battery to transfer power to sprinkler valves 130 of the wired connection to cause the sprinkler valves 130 to actuate to the open or closed position. Once a charge is no longer needed (e.g., the battery is fully charged), a gate or regulator on the PCB may cause the impeller to no longer charge the battery. A regulator may defer the charge to a heat sink. In some embodiments, the impeller may charge the battery over a range of fluid pressures (e.g., high pressures, low pressures) in the wireless valve switch system 120. The impeller may charge the battery little by little as sprinkler valves 130 are controlled to be in the open position. In some embodiments, the PCB may include a regulator that waits until a specific voltage and/or power is being generated by the impeller and coils to then pass the specific voltage and/or power to the batter.

Responsive to a determination (e.g., that a threshold amount of time, such as 10-15 minutes, has passed without the wireless valve switch system 120 receiving communication from the control system 110, that the battery of the wireless valve switch system 120 is not functioning or is below a threshold level, occurrence of a manual override, or the like), the wireless valve switch system 120 may perform a failsafe function. The failsafe function may include one or more of shutting down all corresponding sprinkler valves 130, providing an alert, storing a record in the memory of the wireless switch device, or the like. In some embodiments, the wireless valve switch system 120 may perform the failsafe function based on a settings file. If the power to the control system 110 (e.g., forwarding device 212) were to be disconnected, the wireless valve switch system 120 may shut off (e.g., actuate to a closed position) each connected sprinkler valve 130 within a set amount of time (e.g., 10-15 minutes) of failed communication to the wireless valve switch system 120. This may avoid overwatering and water waste due to sprinkler valves 130 not being turned off due to the power outage to the control system 110. The failsafe may be hardcoded into the wireless valve switch system 120 (e.g., in firmware, in non-volatile computer-readable medium, etc.). Under normal operating conditions, the control system 110 and the wireless valve switch system 120 may communicate wirelessly with each other over set periods of time (e.g., every two seconds), receiving and confirming when a sprinkler valve 130 is on and off.

The wireless valve switch system 120 (e.g., wireless component 122) may send and receive secure signals for all connected sprinkler valves 130 over long distances (e.g., while potentially being submerged in water). The wireless valve switch system 120 and the control system 110 may be able to wirelessly send and receive signals between each other over a distance of 660-6000 feet (e.g., 2000 feet) that may be through one or more buildings, in direct line of sight, underground in the valve box, and/or while submerged in water.

Since sprinkler valves 130 may have drains and may leak, one or more components of the wireless valve switch system 120 (e.g., the turbine component 124) may be completely submerged in water most of its lifetime. The wireless valve switch system 120 (e.g., turbine component 124, wireless component 122) may be waterproof so that outside water doesn't reach electronic compartments of the wireless valve switch system 120. The waterproof level of the wireless valve switch system 120 may be measured using the IP grading system which measures both time and how deep the device is submerged in water as well as exposure to dust. In some embodiments, the wireless valve switch system 120 may have a waterproof rating of IP68 or IP67.

The wireless valve switch system 120 (e.g., wireless component 122) may be configured to be recharged through liquid flow. The lifetime of the battery of the wireless valve switch system 120 may be significantly greater than lifetime of a battery in a battery-operated valve. When a sprinkler valve 130 is actuated to an open position, water flowing through the mainline (e.g., water piping 150) will spin an impeller in the wireless valve switch system 120 that will charge an internal battery. The wireless valve switch system 120 may not allow (e.g., via a gate, via a regulator) the impeller to overcharge the battery. Once the battery is fully charged, a gate or regulator may stop the battery from being further charged. Stator coils may be used to create a magnetic field that generates power.

In some embodiments, a wireless valve switch system 120 (e.g., receiving device, receiver) may have an operating pressure (e.g., internal pressure, water pressure) of 20-200 psi (e.g., 20-35 psi). The water pressure in the water piping 150 may meet the operating pressure (e.g., may be 20-200 psi, may be 20-35 psi). The battery may charge at lower operating pressures and at higher operating pressures (e.g., may charge in both low pressure and high-pressure systems). In some embodiments, the battery is a lithium ion battery (e.g., a 2500 mAh lithium ion battery).

In some embodiments, voltage input from coils (e.g., generated by the coils from the spinning impeller) is provided to the PCB (e.g., voltage input within a range). The wireless valve switch system 120 may have a voltage input from coils provided to PCB of about 5-43 V (e.g., 24 V) (e.g., to not damage the PCB), may have a power input from coils provided to PCB of about 2.5-42 W (e.g., 15 W) (e.g., to not damage the PCB), and/or may have a current output from battery to sprinkler valve 130 of about 2.2 amps. The ranges of power and voltage may allow the wireless valve switch system 120 to generate enough power to recharge the batteries, but not so much as to damage the PCB. The current output of the wireless valve switch system 120 may allow enough current to be transmitted to actuate solenoids of the sprinkler valves 130 on and off. In some embodiments, a user interface (e.g., LED) may indicate (e.g., light up and remain lit) whenever the wireless valve switch system 120 is generating correct voltage and power (e.g., the LED may not be lit when the conditions are not met). Even if the impeller is spinning, the user interface may not provide the indication (e.g., LED may not turn on) until the wireless valve switch system 120 (e.g., coils based on spinning impeller) starts to generate the correct voltage and power.

The wireless valve switch system 120 (e.g., wireless component 122) may have a time to full charge of about 5 hours to recharge a completely dead battery when the impeller is operating within the power and voltage ranges. The wireless valve switch system 120 may have a run time of about 120-360 minutes on a full charge. The run time may indicate how long a wireless valve switch system 120 (e.g., with an impeller spinning) can deliver the desired voltage and power ranges.

If the power ranges generated by the stator coils are met, a completely full battery may be able to actuate a sprinkler valve 130 (e.g., turn on or off a solenoid valve) 200-300 times (e.g., at least 275 times) until the battery is completely drained. It may take about 5 hours to recharge the battery if it were completely drained.

The wireless valve switch system 120 may be able to connect to existing DC latching solenoids (e.g., sprinkler valves 130) or AC solenoids. The wireless valve switch system 120 may have a pressure loss of 0-5 psi (e.g., 2 psi) (e.g., under normal operating conditions) to allow the sprinkler valves 130 to turn on and off (e.g., otherwise the solenoids may not turn on and off due to insufficient pressure). The wireless valve switch system 120 may have a voltage output from the battery to a sprinkler valve 130 of about 9.1-10 V (e.g., 9.5 V) to allow actuating of the solenoid.

The wired connection between the wireless valve switch system 120 and a sprinkler valve 130 may have a similar or same gauge of wire (e.g., 12-18 gauge wire) as existing sprinkler valves 130 to allow for parity.

The wireless valve switch system 120 (e.g., wireless component 122) may have capacity to connect to multiple (e.g., up to six, up to 250, etc.) sprinkler valves 130 via wired connections. The wireless valve switch system 120 may control (e.g., be electrically connected to) multiple (e.g., up to 4, up to 6, or up to 250, etc.) sprinkler valves 130. The wireless valve switch system 120 may be able to send instructions to multiple sprinkler valves 130 under multiple circumstances. For example, the wireless valve switch system 120 may turn two sprinkler valves 130 on at once or have two sprinkler valves 130 on during the same period of time.

The wireless valve switch system 120 (e.g., wireless component 122) may use an encryption protocol (e.g., advance encryption standard (AES) security) for transmission and receipt of instructions between the control system 110 and the wireless valve switch system 120. The wireless valve switch system 120 may minimize power consumption and conserve power.

The wireless valve switch system 120 may be housed under a 6-inch or 10-inch round valve box or a rectangular valve box (e.g., enclosure). The valve box may be reliant (e.g., surge protective, vibration resistant, or the like). The wire leads to a specific number of sprinkler valves 130 from the wireless valve switch system 120 may have a length of about 6 to 10 inches.

The wireless valve switch system 120 (e.g., turbine component 124) may couple (e.g., fluidly and physically connect) with a mainline diameter of about 1-2 inches (e.g., 1, 1.25, 1.5, or 2 inches). In some embodiments, a first type of wireless valve switch system 120 is configured to couple with a first size of water piping 150 (e.g., ¾"-inch to 1.0-inch schedule 40 mainline) and a second type of wireless valve switch system 120A is configured to couple with a second size of water piping 150 (e.g., 1.5-inch to 2.0-inch schedule 40 mainline). The wireless valve switch system 120 may include a variable sized inlet and/or outlet (e.g., see FIGS. 3D-F). A variable sized inlet and/or outlet may be provided via a corresponding slip configuration (e.g., interference-type configuration). A variable sized inlet and/or outlet may be provided via a corresponding threaded connection. A female pipe taper (FPT) may be on the inside and/or a male pipe taper (MPT) may be on the outside of each casing of a wireless valve switch system 120 to accommodate various sizes. The wireless valve switch system 120 (e.g., turbine component 124) may have one inlet/outlet configuration with a threaded union connection with the outlet side of the union being a slip-interference or socket-type connection (e.g., see FIGS. 3D-F). In some embodiments, the wireless valve switch system 120 may fluidly and physically connect with piping up to 12-inches in diameter (e.g., agricultural piping, etc.).

The wireless valve switch system 120 (e.g., wireless component 122, turbine component 124) may have one or more user interfaces that indicate whether the wireless valve switch system 120 one or more of is sending instructions, receiving instructions, is paired, has an impeller (e.g., turbine) that is spinning, is charging, has remaining charge, or the like. The user interface may include one or more of a light emitting diode (LED), graphical user interface (GUI), button, dial, interface with a mobile application, or the like. The user interface may have a number of positions (e.g., one position for each sprinkler valve the wireless valve switch system 120 can control plus a reset position, such as 8 total positions). In some embodiments, the user interface (e.g., an external visible LED) may indicate (e.g., may light up indicating) that the impeller is generating the specified amount of voltage and power. In some embodiments, the wireless valve switch system 120 may have a label proximate the LED indicating that the light indicates power generation, differentiating the LED from another LED light that indicates pairing.

The wireless valve switch system 120 (e.g., wireless component 122) may have a user interface (e.g., LED) that is used for pairing and for resetting the wireless valve switch system 120. For troubleshooting and to verify the wireless valve switch system 120 is within the bounds of the wireless signal from the control system 110, the wireless valve switch system 120 may have a user interface (e.g., LED) that indicates the wireless valve switch system 120 is trying to pair with the wireless signal from the control system 110. The user interface may indicate to the user that the user interface is for pairing and resetting the device.

The wireless valve switch system 120 may be configured to a range of compliant temperatures. A range of compliant temperatures may refer to a temperature range at which the wireless valve switch system 120 maintains structural and/or functional capabilities without permanent damage. In some embodiments, the range of compliant temperatures may be about −0.4 to 150 degrees Fahrenheit or 18 to 66 degrees Centigrade. The wireless valve switch system 120 may be configured for winterization. The wireless valve switch system 120 may experience high and low temperatures during certain times of the year (e.g., winter, summer) and may accommodate for those (e.g., freezing, high) temperatures. To prepare for cold temperatures, air may be blown through the wireless sprinkler valve system 100 (e.g., through one or more of water piping 150, wireless valve switch system 120, sprinkler valve 130, sprinkler heads 140, or the like) to remove liquid (e.g., water), causing high-speed spinning of the impeller. The impeller is configured to be capable of this air pressure without seizing or malfunctioning.

The wireless valve switch system 120 (e.g., turbine component 124) may be configured for one or more operating pressures. A first operating pressure may refer to the compressed air psi that is pumped through the system when winterization occurs. A second operating pressure may refer to liquid (e.g., water) psi that is provided through the wireless valve switch system 120, sprinkler valve 130, and sprinkler heads 140.

In some embodiments, the wireless valve switch system 120 may be disassembled (e.g., easily disassembled) to replace parts (e.g., electronic parts) and then reassembled. The wireless valve switch system 120 may have an electronic housing (e.g., that houses all electronics, such as the PCB and stator coils, electromagnetic casing 134 of FIG. 3), an impeller (e.g., fan blades 118 of FIG. 3), and a plastic casing (e.g., casing 111 of FIG. 3). In some embodiments, the impeller connects to the electronics housing and then the electronics housing may fasten to the plastic casing. The electronic housing may be connected to the plastic housing via fasteners (e.g., MS Hex Head Phillips screws). In some embodiments, the turbine component 124 is remote from the wireless component 122. The turbine component 124 may contain the impeller, electromagnetic casing, and plastic injected case with a power cable of a specified length. The wireless component 122 may house all other noted equipment inclusive of batteries, both rechargeable and non-rechargeable batteries.

In some embodiments, the wireless valve switch system 120 (e.g., wireless component 122) has a reset button that will clear all of the pairings that are set up with the controller system 110. The reset button may also be used for pairing. A dial may be turned to the reset position, and the reset button may be held for an amount of time (e.g., for five seconds) while the pairing/reset LED blinks on and off. Once the amount of time has expired, the pairing LED may turn solid indicating that all of the pairings have been cleared. Responsive to the dial being turned to another position on the wireless valve switch system 120, the pairing LED may not light up because the sprinkler valves 130 (e.g., stations) no longer being paired. In some embodiments, the wireless valve switch system 120 (e.g., wireless component 122) is pre-paired with the control system 110 (e.g., forwarding device 212) (e.g., forwarder and receiver were pre-paired prior to packaging) and that no additional pairing is to be performed (e.g., the wireless valve switch system 120 may not have a reset button).

The wireless valve switch system 120 (e.g., wireless component 122) may have a dial that may be turned to different positions (e.g., turned and remain at one of eight positions, until moved to the next positions). In some embodiments, the positions may be labeled 1-6, run, and reset. The positions 1-6 may correspond to the six connecting sprinkler valves 130. The run position may be used once the sprinkler valves 130 have been paired and the wireless valve switch system 120 is ready to operate. The reset position may be used to reset existing pairings. The different positions may be labeled and clearly legible. This may be present in a wireless sprinkler control box 220 (e.g., integral sprinkler control box 210 and forwarding device 212).

Referring to FIG. 1A, each wireless valve switch system 120 may include a wireless component 122 and/or a turbine component 124.

Referring to FIG. 1B, wireless valve switch system 120C may include a wireless component 122A that is remote from the water piping 150. The wireless component 122A of wireless valve switch system may be battery-operated. The wireless component 122A may receive instructions from the control system 110 and sensor data from one or more devices 132 (e.g., flow meter, pressure meter, moisture sensor, etc.). The wireless component 122A may transmit the sensor data to the control system 110. The wireless component 122A may transmit responses (e.g., acknowledgements) to the instructions to the control system 110.

Wireless valve switch system 120D may include a wireless component 122B and a turbine component 124. The turbine component 124 may be installed in the water piping 150 remote from the wireless component 122B. The turbine component 124 and the wireless component 122B may be coupled via a wired connection. In some embodiments, a turbine component 124 is coupled to more than one wireless component 122. In some embodiments, more than one turbine component 124 are coupled to the same wireless component 122.

In some embodiments, the control system 110 includes a sprinkler control box 210 coupled (e.g., via wired connection) to a forwarding device 212 (e.g., see FIG. 2A).

FIGS. 2A-C illustrate control systems 110A-C for wireless sprinkler valve systems 100, according to certain embodiments. One or more components of each control system 110 may communicate with one or more wireless valve switch systems 120 (e.g., wireless components 122) via a wireless network.

Referring to FIG. 2A, a control system 110A may include a sprinkler control box 210 and a forwarding device 212. The sprinkler control box 210 may receive user input (e.g., via a graphical user interface (GUI), buttons, dials, etc.) to provide valving instructions for one or more sprinkler valves (e.g., up to a maximum number of sprinkler valves or zones). The sprinkler control box 210 may generate a schedule based on user input of which sprinkler valves are to be actuated at what time and for what duration (e.g., user input of sprinkler valve, day, time, duration, etc.) and may transmit the valving instructions based on the schedule. The control system 110A may have one or more wired connections that are coupled to the sprinkler control box 210 (e.g., via screw clamp) to control one or more sprinkler valves. In some embodiments, a first subset of the wired connections are coupled between the sprinkler control box 210 and a first subset of the sprinkler valves 130 and a second subset of the wired connections are coupled between the sprinkler control box 210 and the forwarding device 212 (e.g., to control a second subset of sprinkler valves). The sprinkler control box 210 may control the first subset of the sprinkler valves via wired connections and may control the second subset of the sprinkler valves via a wireless connection. In some embodiments, a third subset of wired connections are coupled between the sprinkler control box 210 and a first subset of other devices 132 (e.g., flow sensors, pressure sensors, moisture sensors, or the like). In some embodiments, a fourth subset of wired connections are coupled between the sprinkler control box 210 and the forwarding device to communicate with a second subset of other devices 132 (e.g., flow sensors, pressure sensors, moisture sensors, or the like that are coupled to one or more wireless valve switch systems 120) wirelessly using the same wireless protocols.

The sprinkler control box 210 may generate valving instructions (e.g., based on a schedule, based on user input, etc.), transmit valving instruction to the forwarding device 212 via a wired connection, and the forwarding device 212 may transmit the valving instructions via a wireless network. The forwarding device 212 may receive a response to the valving instructions via the wireless network and may transmit the response to the sprinkler control box 210. In some embodiments, the forwarding device 212 may encode valving instructions to be sent via the wireless network and may decode responses received via the wireless network.

In some embodiments, control system 110A may include a first wired connection coupled between the sprinkler control box 210 and a first sprinkler valve (e.g., for controlling the first sprinkler valve) and a second wired connection coupled between the sprinkler control box 210 and the forwarding device 212 (e.g., for controlling a second sprinkler valve via a wireless valve switch system 120).

For example, the control system 110A may be configured to control the first sprinkler valve via a first wired connection and the second sprinkler valve via a second wired connection. Responsive to the second wired connection being damaged (e.g., causing the second sprinkler valve to be orphaned), the sprinkler control box 210 may be coupled to the forwarding device 212 via a wired connection (e.g., via the same output of the sprinkler control box 210 that was used to control the second sprinkler valve) and the forwarding device 212 may wirelessly communicate with the wireless valve switch system 120 (e.g., wireless component 122) that is coupled with the second sprinkler valve. This may avoid re-trenching, cutting concrete, and disturbing the area between the sprinkler control box 210 and the second sprinkler valve (e.g., that conventionally would have been done to lay new electrical wiring).

In another example, the control system 110A may be configured to control one or more sprinkler valves via corresponding wired connections between the sprinkler control box 210 and each of the one or more sprinkler valves. Responsive to adding a new sprinkler valve (e.g., for a new area to be watered, that was not previously coupled via a wired connection to the sprinkler control box 210), the sprinkler control box 210 may be coupled to the forwarding device and the forwarding device 212 may control the new sprinkler valve via a wireless valve switch system 120 (e.g., wireless component 122). This may avoid trenching, cutting concrete, and disturbing the area between the sprinkler control box 210 and the new sprinkler valve (e.g., that conventionally would have been done to lay new electrical wiring).

In some embodiments, the sprinkler control box 210 may be an existing and/or conventional wired sprinkler control box. In some embodiments, the sprinkler control box 210 may be a new sprinkler control box. In some embodiments, the forwarding device 212 may be used for controlling all of the sprinkler valves (e.g., and other devices 132) coupled to the sprinkler control box 210. In some embodiments, the forwarding device 212 may be used for controlling a portion of the sprinkler valves (e.g., and other devices 132) coupled to the sprinkler control box 210. In some embodiments, the forwarding device 212 may be used for one or more of orphaned sprinkler valves (e.g., sprinkler valves for which the wired connection becomes damaged), new sprinkler valves (e.g., sprinkler valves added after the wired connections were installed), and sprinkler valves where trenching and laying wired connections would be difficult or prohibitively expensive. For example, the forwarding device 212 for sprinkler valves that are located further than a threshold distance away, where the ground would be difficult to trench, there is an obstruction (e.g., ravine, body of water, piping, electrical conduits, etc.), the area is not to be disturbed (e.g., has been landscaped, disturbance of the natural landscape is to be minimized, etc.), or the like.

Referring to FIG. 2B, a control system 110B may include a wireless sprinkler control box 220. The wireless sprinkler control box 220 may generate valving instructions, send the valving instructions via a wireless network, and receive responses to the valving instructions via the wireless network. The wireless sprinkler control box 220 may encode the valving instructions to be transmitted and may decode the responses received. In some embodiments, the wireless sprinkler control box 220 has the functionalities of both the sprinkler control box 210 and the forwarding device 212.

Referring to FIG. 2C, a control system 110C may include a forwarding device 212, a cloud computing system 230, and one or more user devices 240A. The forwarding device 212 of control system 110C may include the functionalities of one or more of forwarding device 212 of control system 110A, sprinkler control box 210 of control system 110A, or wireless sprinkler control box 220 of control system 110B.

The cloud computing system 230 may refer to a collection of physical machines (e.g., server devices) that host applications providing one or more services to multiple components via network. In some embodiments, the applications hosted by the cloud computing system 230 may provide services (e.g., scheduling, viewing, remote management, etc.) to users accessing the cloud computing system 230 via a network. The applications may allow users to manipulate (e.g., access, create, edit, store, delete, share, collaborate, print, etc.) electronic documents (e.g., schedules, rules, configurations, etc.). The cloud computing system 230 may include a server device and one or more data stores. The forwarding device 212 may be hardwired (e.g., via Ethernet) to a network device of a local area network, to gain access to a private or public network to access the cloud computing system 230. The forwarding device 212 may communicate with the cloud computing system 230 using secure communications (e.g., data transmitted between the forwarding device 212 and the cloud computing system 230 may be encrypted). The cloud computing system 230 can provide logic and configuration for the wireless sprinkler valve system 100. The cloud computing system 230 may receive information (e.g., via one or more application program interfaces (APIs), weather information, calendar information, etc.) for controlling the wireless sprinkler valve system 100. The cloud computing system 230 may determine which wireless valve switch systems 120 (e.g., wireless components 122) and/or sprinkler valves 130 each forwarding device 212 and each application is authorized to control and the priority of control. For example, the cloud computing system 230 may determine that forwarding device 212 is authorized to control sprinkler valves 130 that are connected to a wireless valve switch system 120 (e.g., wireless component 122). In another example, the cloud computing system 230 may determine that an application logged in by a first user is authorized to control a first sprinkler valve 130 of the wireless valve switch system 120 (e.g., wireless component 122). During configuration (e.g., commissioning, set-up by an administrator), the cloud computing system 230 may receive instructions of which users and which forwarding devices 212 are authorized to control which sprinkler valves 130 (e.g., communicate with which wireless valve switch systems 120, control which sprinkler valves 130 through which wireless valve switch systems 120, etc.).

In some embodiments, cloud computing system 230 may use machine learning to provide control of the sprinkler valves 130. For example, the cloud computing system 230 may receive training data including of input of historical condition data and target output of historical valving instructions. The historical condition data may include one or more of weather information (e.g., temperature, humidity), moisture level (e.g., rainfall, soil moisture level), calendar information (e.g., weekend, weekday, holiday, scheduled events), or the like. The historical valving instructions may include one or more of which of the sprinkler valves 130 actuated, for how long each of the sprinkler valves 130 was actuated, what time of day each of the sprinkler valves 130 was actuated, etc. The cloud computing system 230 may train a machine learning model based on the training data to generate a trained machine learning model. The trained machine learning model may be used by inputting current condition data (e.g., weather information, moisture level, calendar information, etc.) to generate output indicative of predicted valving instructions (e.g., what sprinkler valves are to be actuated for how long at what time of day, etc.). The cloud computing system 230 may control the sprinkler valves 130 (e.g., via the forwarding device 212) based on the predicted valving instructions. Upon receiving user input (e.g., via user device 240) varying from the predicted valving instructions, the trained machine learning model may be retrained based on the current condition data and the user input.

In some embodiments, control of the sprinkler valves 130 may be distributed over two or more of the cloud computing system 230, the forwarding device 212, and/or the wireless valve switch system 120 (e.g., wireless component 122). For example, the cloud computing system 230 may provide settings files (e.g., schedule, rules, failsafe, etc.) to the forwarding device 212 and the forwarding device 212 may control the sprinkler valves 130 based on the settings files. In some embodiments, the forwarding device 212 may provide the settings files (e.g., schedule, rules, etc.) to the wireless valve switch system 120 (e.g., wireless component 122) and the wireless valve switch system 120 may control the sprinkler valves 130 based on the settings files. The forwarding device 212 and/or wireless valve switch system 120 (e.g., wireless component 122) may control the sprinkler valves 130 based on the settings files even without network connection (e.g., when there is no communication between cloud computing system 230 and forwarding device 212 and/or between forwarding device 212 and wireless valve switch system 120).

The cloud computing system 230 may provide additional instructions to the forwarding device 212 to deviate from the settings files in controlling the sprinkler valves 130 (e.g., responsive to receiving user input via user device 240). Providing settings files (e.g., schedule, rules, failsafe, etc.) to the forwarding device 212 and/or wireless valve switch system 120 (e.g., wireless component 122) may reduce bandwidth, energy consumption, and processor overhead of the control system 110 to control the sprinkler valves 130 (e.g., the control system 110 only provides instructions that are deviations to the settings files).

In some embodiments, the user devices 240 may communicate directly with the forwarding device 212 and/or wireless valve switch system 120 (e.g., wireless component 122). In some embodiments, the cloud computing system 230 may communicate directly with the wireless valve switch system 120 (e.g., wireless component 122).

User devices 240A-B (hereinafter "user device 240") may be one or more of a mobile user device (e.g., smart phone, tablet), a desktop, laptop, etc. An application executing on the user device may receive user input (e.g., selection of a sprinkler valve 130, time and duration for actuation of a sprinkler valve 130, selection of a schedule for controlling sprinkler valves 130, etc.) via a graphical user interface (GUI) displayed via the user device and may transmit the user input to the cloud computing system 230. Responsive to determining the user input is a request to view information (e.g., monitor current status of sprinkler valves 130, view moister level of area being served by sprinkler valves 130, etc.), the cloud computing system 230 may retrieve the information and transmit the information to the user device to cause the application to display the requested information. Responsive to determining that the user input is a request to change operation (e.g., schedule) of one or more sprinkler valves 130, the cloud computing system 230 may transmit the user input to the forwarding device 212 and the forwarding device 212 may control the one or more sprinkler valves 130 (e.g., by transmitting updated valving instructions to the wireless valve switch system 120) based on the user input. The cloud computing system 230 may update schedules for controlling the sprinkler valves based on user input via the user devices 240, generate updated settings files based on the updated schedules, and transmit the updated settings files to the forwarding device 212 and/or wireless valve switch system 120 (e.g., wireless component 122).

In some embodiments, the forwarding device 212 relays valving instructions and responses. In some embodiments, the forwarding device 212 encodes valving instructions and decodes responses. In some embodiments, the forwarding device 212 generates valving instructions and/or generates responses.

Figure 2D:
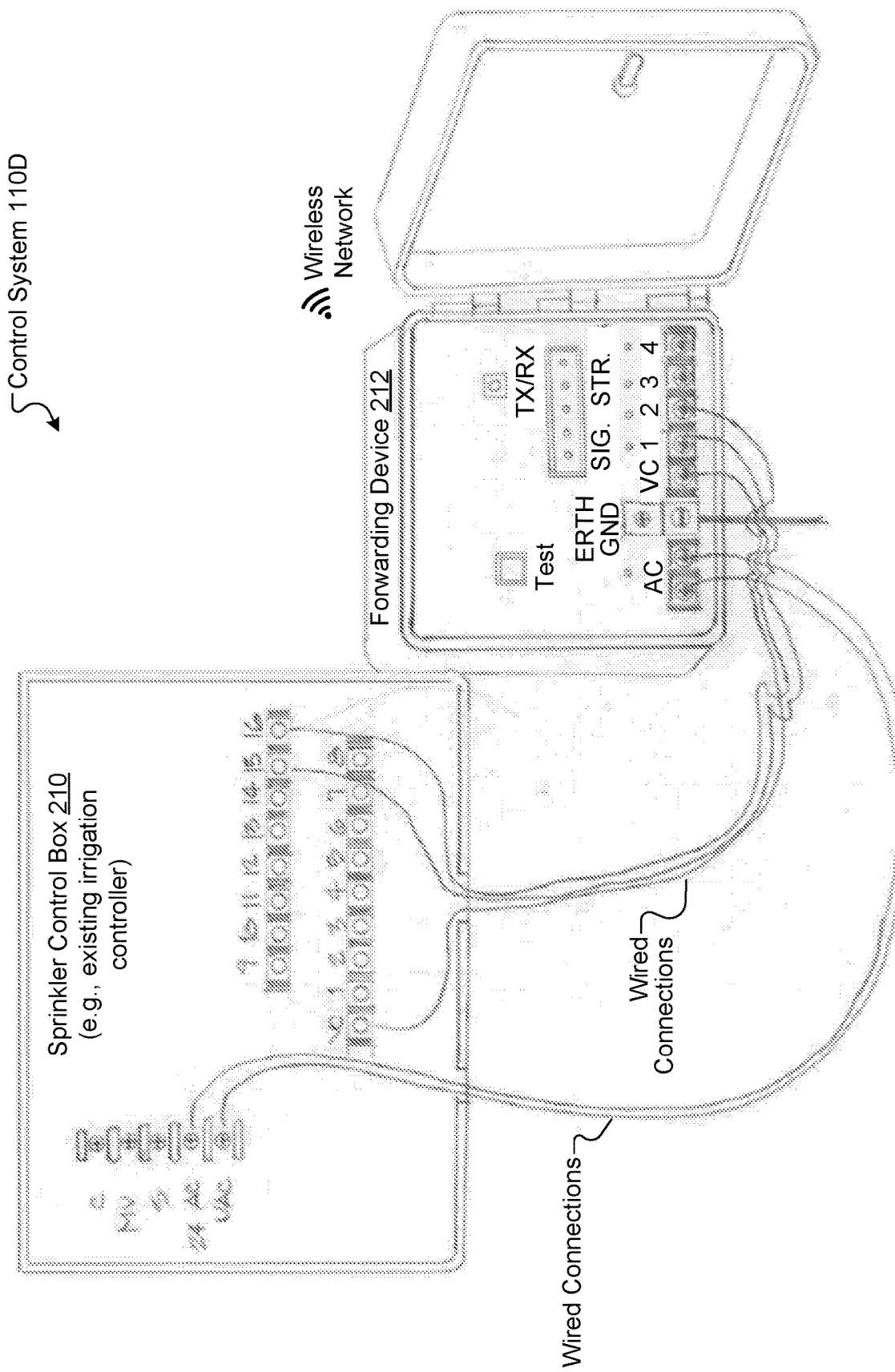

FIG. 2D illustrates a control system 110D for a wireless sprinkler valve system 100, according to certain embodiments. The control system 110D includes a sprinkler control box 210 (e.g., existing irrigation controller, new irrigation controller) and a forwarding device 212. The sprinkler control box 210 includes wired connections to control sprinkler valves 130. One or more of the wired connections may be directly wired to corresponding sprinkler valves 130 or other device (e.g., sensors). One or more of the wired connections may be directly wired to the forwarding device 212. The forwarding device 212 may transmit signals (e.g., on and off commands, etc.) to the corresponding sprinkler valves 130 and/or other devices.

Figure 3A:
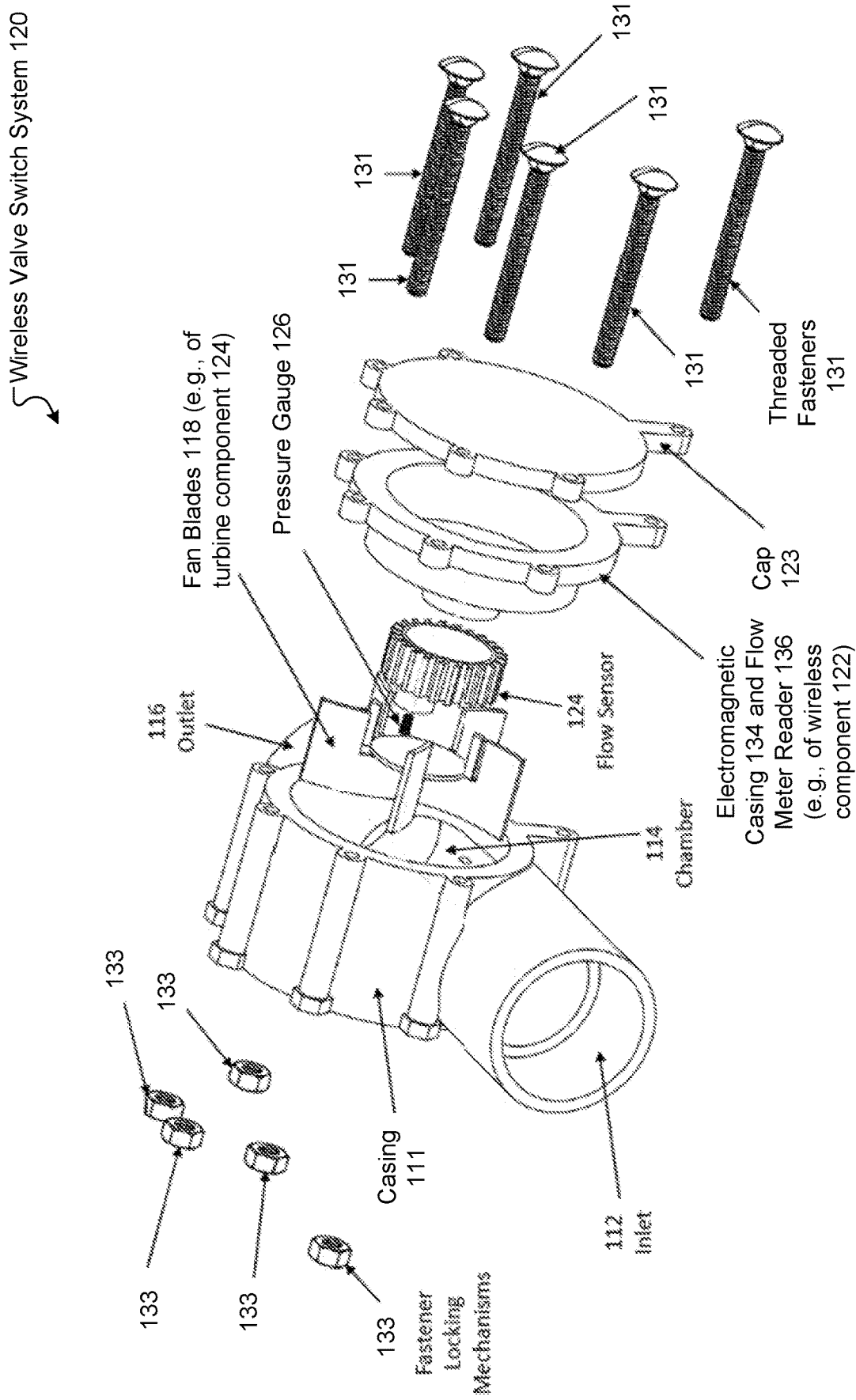
FIG. 3A illustrates an exploded view of a wireless valve switch system, according to certain embodiments.
Figure 3B:
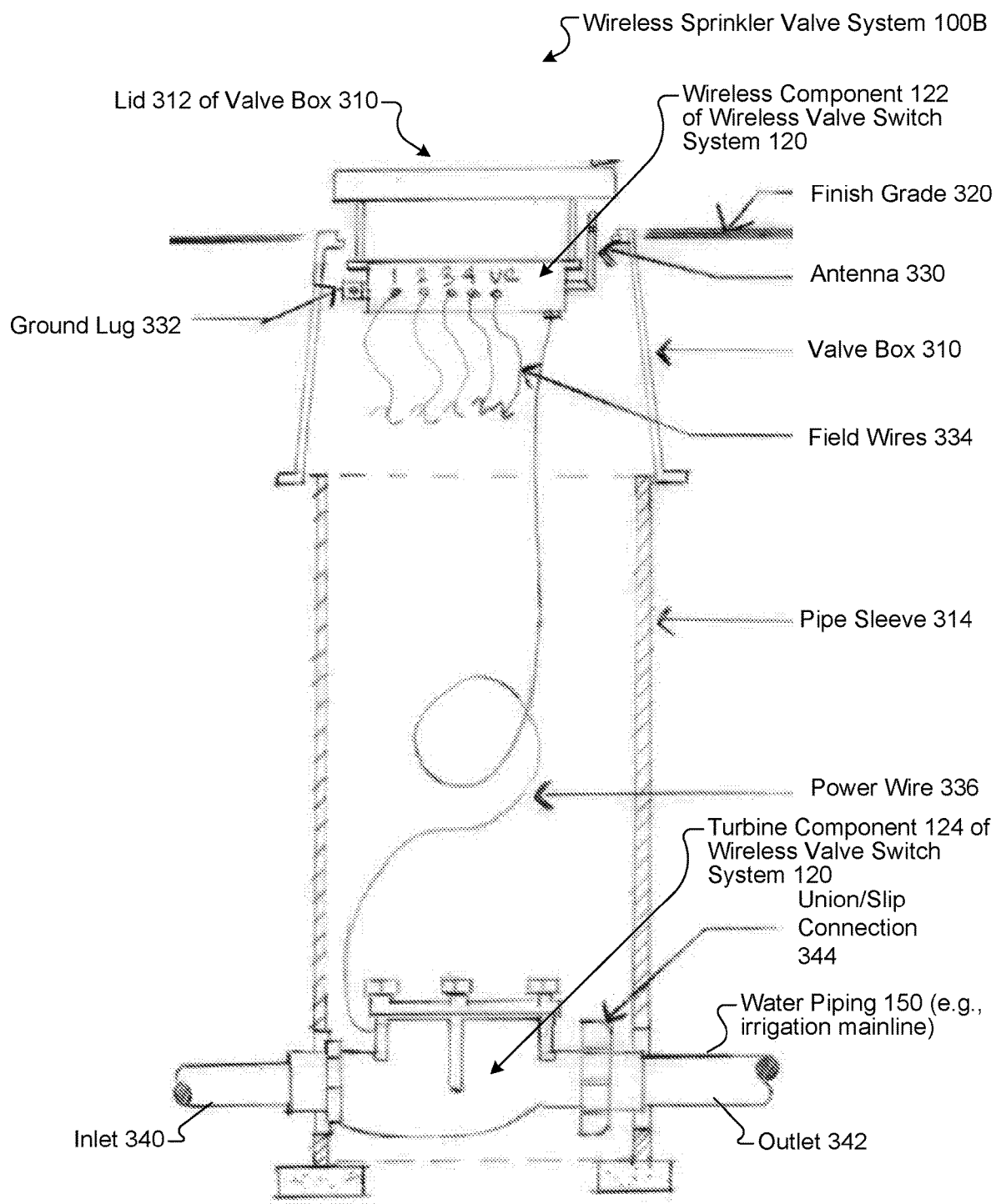
FIG. 3B illustrates a wireless valve switch system, according to certain embodiments.
Figure 3C:
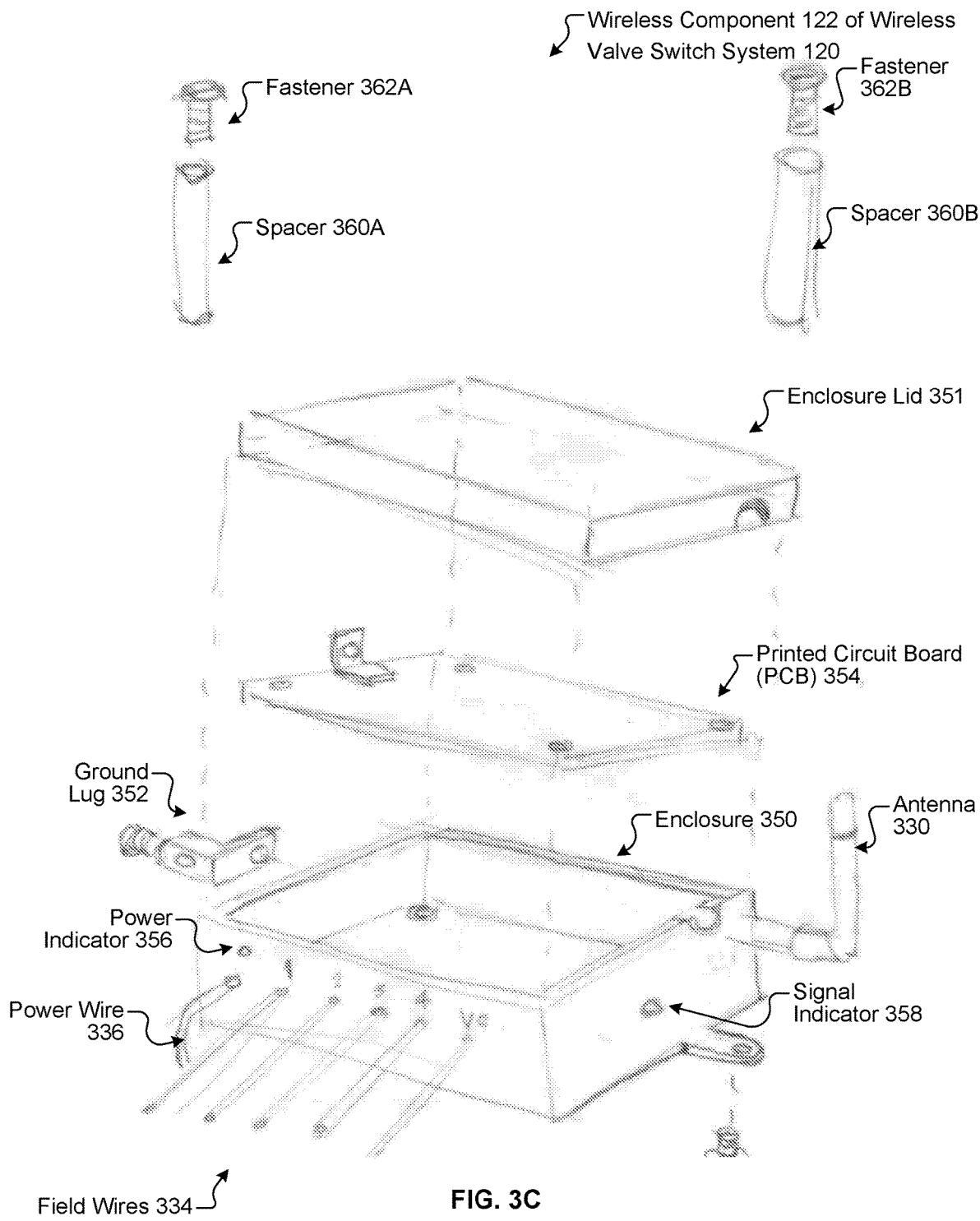
FIG. 3C illustrates a wireless component of a wireless valve switch system, according to certain embodiments.

FIGS. 3A-F display one or more components of wireless valve switch systems 120, according to certain embodiments. FIG. 3A depicts an exploded view of a wireless valve switch system 120, according to certain embodiments. FIG. 3B illustrates a wireless valve switch system 120, according to certain embodiments. FIG. 3C illustrates a wireless component of a wireless valve switch system 120, according to certain embodiments. FIG. 3D illustrates a turbine component 124 of a wireless valve switch system 120, according to certain embodiments. FIGS. 3E-F illustrate portions of a turbine component 124 of a wireless valve switch system 120, according to certain embodiments.

One or more of the wireless valve switch systems 120 depicted in FIGS. 3A-F may have similar functionality and/or features as one or more of the wireless valve switch systems 120 described in relation to FIGS. 1A-B. The wireless valve switch system 120 has a casing 111 with an inlet 112 and an outlet 116. The casing 111 forms a chamber 114 that houses fan blades 118 (e.g., of a turbine). In some embodiments, the inlet 112 has substantially the same inside diameter as the water piping 150 (e.g., 0.5 to 2 inches in diameter, up to 12 inches in diameter, etc.). The outlet 116 may have substantially the same diameter as the inlet 112. In some embodiments, the chamber 114 may have an inside diameter that is about 2-4 times the inside diameter of one or more of the inlet 112, the outlet 116, or the water piping 150. For example, the chamber 114 may have an inside diameter of about 1 inch to 8 inches. The turbine (e.g., including the fan blades) may have a diameter that is up to the inside diameter of the chamber 114. For example, the turbine may have a diameter that is about 1-8 inches.

The water in the water piping 150 may have a pressure of 30 to 50 pounds per square inch (psi). In some embodiments, the piping 150 may have a pressure of less than 30 psi. In some embodiments, the piping may have a pressure of greater than 50 psi. In some embodiments, the wireless valve switch system 120 (e.g., turbine component 124) may provide a pressure loss of less than 10 psi. In some embodiments, the wireless valve switch system 120 (e.g., turbine component 124) may provide a pressure loss of less than 5 psi. In some embodiments, the wireless valve switch system 120 (e.g., turbine component 124) may provide a pressure loss of less than 3 psi. In some embodiments, the wireless valve switch system 120 (e.g., turbine component 124) may provide a pressure loss of less than 1 psi. In some embodiments, the wireless valve switch system 120 (e.g., turbine component 124) provides substantially no pressure loss.

A pressure sensor 126 (e.g., pressure gauge) or flow sensor 128 may be coupled to (e.g., located in) the chamber 114. The pressure data received from the pressure sensor 126 may be used to determine whether there is leakage in the wireless sprinkler valve system 100 (e.g., due to a pressure drop, due to a pressure that meets a threshold pressure). The flow rate data received from the flow sensor 128 may be used to determine a quantity of water used by the wireless sprinkler valve system 100 over time. The chamber 114 of the casing 111 may be covered by an electromagnetic casing 134 (e.g., stator) which is covered by a cap 123. The electromagnetic casing 134 may include or may be coupled to a flow meter reader 136.

Wireless valve switch system 120 (e.g., turbine component 124) allows water to enter the chamber 114 of the casing 111 through the inlet 112, turn the fan blades 118, and exit through the outlet 116. The fan blades 118 act as a turbine (e.g., rotary mechanical device that extracts energy from fluid flow) and generate power upon being moved by water flowing through the chamber 114. The turbine (that includes the fan blades 118) may include a magnet. The electromagnetic casing 134 may include a stator coil and may be disposed proximate the turbine. As the turbine spins, the spinning turbine (e.g., rotating magnet) causes a rotating magnetic field that creates electric current via the stator coil (e.g., the stator coil may be stationary). In some embodiments, the generated power is used to transmit electronic data from field hardware (e.g., devices 132 such as one or more of pressure sensor 126, flow sensor 128, temperature sensor, humidity sensor, rainfall sensor, soil moisture sensor, master valve, or the like) coupled to the wireless valve switch system 120. In some embodiments, the generated power is used to recharge a rechargeable power source, which may be disposed in the electromagnetic casing 134 (e.g., proximate the flow meter reader 136). The electrical current from the stator coil may be stored in a storage device (e.g., one or more rechargeable batteries, power storage device 516 of FIG. 5).

In some embodiments, pressure sensor 126 measures the pressure at the inlet 112, before the fan blades 118. This allows the pressure drop across the fan blades 118 to be determined. In some embodiments, pressure sensor 126 measures the pressure at the outlet 116, after the fan blades 118. This allows the pressure of the water at the sprinkler system to be measured. In some embodiments, two or more pressure sensors 126 may be used to measure the pressure at two or more locations (e.g., at the inlet 112, at the outlet 116, proximate the fan blades 118, etc.).

In some embodiments, pressure sensor 126 includes a spring that is displaced by the water in the chamber, with the displacement registered in a sensor. The spring is sealed to prevent corrosion and other negative effects from the water to the spring and sensor.

The flow sensor 128 measures the amount of water flowing through the wireless valve switch system 120 (e.g., turbine component 124) and/or water piping 150. In some embodiments, one or more of the fan blades 118 is made of an electromagnetic material. In other embodiments, a magnetic material is attached to one or more of the fan blades 118. In either case, the speed at which the fan blades 118 are rotating may be measured by a magnetic sensor that detects when the magnetic fan blades or magnetic material pass by. The flow is then determined based on the rate at which the fan blades are spinning and the volume capable of flowing through the chamber 114 in the wireless valve switch system 120 (e.g., turbine component 124).

A temperature sensor (e.g., thermostat, etc.) may determine the air temperature proximate the wireless valve switch system 120. A humidity sensor may determine the humidity level of the air proximate the wireless valve switch system 120. A rainfall sensor may determine an amount of rainfall proximate the wireless valve switch system 120. A soil moisture sensor may determine moisture level of the soil proximate the wireless valve switch system 120.

The measurements (e.g., from the pressure sensor 126, flow sensor 128, etc.) can be accessed from a memory of the wireless valve switch system 120 in the electromagnetic casing 134 (e.g., and flow meter reader 136). In some embodiments, the measurements can be accessed wirelessly using wireless communications hardware in the electromagnetic casing 134 (e.g., and flow meter reader 136). In some embodiments, the measurements can be read visually from a display on the electromagnetic casing 134 (e.g., via flow meter reader 136).

The electromagnetic casing 134 and cap 123 may be held in place by fasteners. In some embodiments, these are threaded fasteners 131, which are held in place by fastener locking mechanisms 133. Fasteners sufficient to affix the electromagnetic casing 134 and cap 123 may be used.

FIG. 3B illustrates a wireless valve switch system 120, according to certain embodiments. In some embodiments, the wireless component 122 and the turbine component 124 of the wireless valve switch system 120 are separate components (e.g., remote from each other) that are coupled via an electrical connection.

The wireless component 122 may be disposed in a valve box 310 proximate a lid 312 of the valve box 310 (e.g., mounted to the valve box lid). The lid 312 of the valve box 310 may be disposed proximate the finish grade 320.

The wireless component 122 may have an antenna 330 (e.g., similar to an antenna of a cellular phone, disposed within the wireless component 122, extending from the wireless component 122, etc.). The antenna 330 may be disposed proximate the lid 312 and/or finish grade 320. The wireless component 122 include a ground lug 332 and one or more field wires 334 (e.g., configured to electrically couple to sprinkler valves 130, other devices, or the like). The wireless component 122 may include a power wire 336 that is electrically coupled to the turbine component 124. The turbine component 124 may be disposed in the valve box 310 or in a pipe sleeve 314 below the valve box. The turbine component 124 may be installed in the water piping 150. The turbine component 124 may include an inlet 340, an outlet 342, and a union/slip connection 344 (e.g., threaded union).

The wireless component 122 may have a power indicator (e.g., LED) that indicates when the wireless component 122 is receiving power (e.g., from a battery, from the turbine component 124, etc.). The wireless component may include a transmitting/receiving (TX/RX) indicator (e.g., LED) that indicates when the wireless component 122 is transmitting and/or receiving data. The wireless component 122 may include a visual indication (e.g., label on a sidewall of the wireless component 122) of an identifier of each wire (e.g., valve com, station 1, station 2, station 3, station 4, etc.).

FIG. 3C illustrates a wireless component 122 of a wireless valve switch system 120, according to certain embodiments. The wireless component 122 may include an enclosure 350 and an enclosure lid 351 to form an inner volume. Electrical components, such as a printed circuit board (PCB) 354, wireless module 512, processing device 514, power storage device 516, memory 518, or the like may be stored within the inner volume formed by the enclosure 350 and enclosure lid 351.

The wireless component 122 may include one or more of a power indicator 356, a power wire 336 (e.g., power cable), field wires 334, signal indicator 358, an antenna 330, a ground lug 352, or the like. The wireless component 122 may further include one or more spacers 360 and one or more corresponding fasteners 362 to couple (e.g., and offset) the wireless component 122 to the lid 312 of the valve box 310 (e.g., see FIG. 3B).

FIGS. 3D-F illustrate portions of a turbine component 124 of a wireless valve switch system 120, according to certain embodiments. One or more of the ports (e.g., inlet and/or outlet) of the turbine component 124 may provide a socket-type inlet or outlet (e.g., variable sized inlet and outlet to accommodate two different pipe sizes, such as ¾" and 1" or 1.5" and 2"). As shown in FIGS. 3E-F, a larger-diameter piping (e.g., 1" diameter) may couple to the outside surface of the socket-type inlet or outlet and a smaller-diameter piping (e.g., ¾" diameter) may couple to the inside surface of the socket-type inlet or outlet. The turbine component 124 may have a threaded union to assist with coupling the socket-type inlet and the socket-type outlet to the water piping (e.g., existing water piping) and then securing the turbine component 124 via the threaded union. A set amount of water piping may be cut to place the turbine component 124 within the piping using the threaded union.

Figure 4:
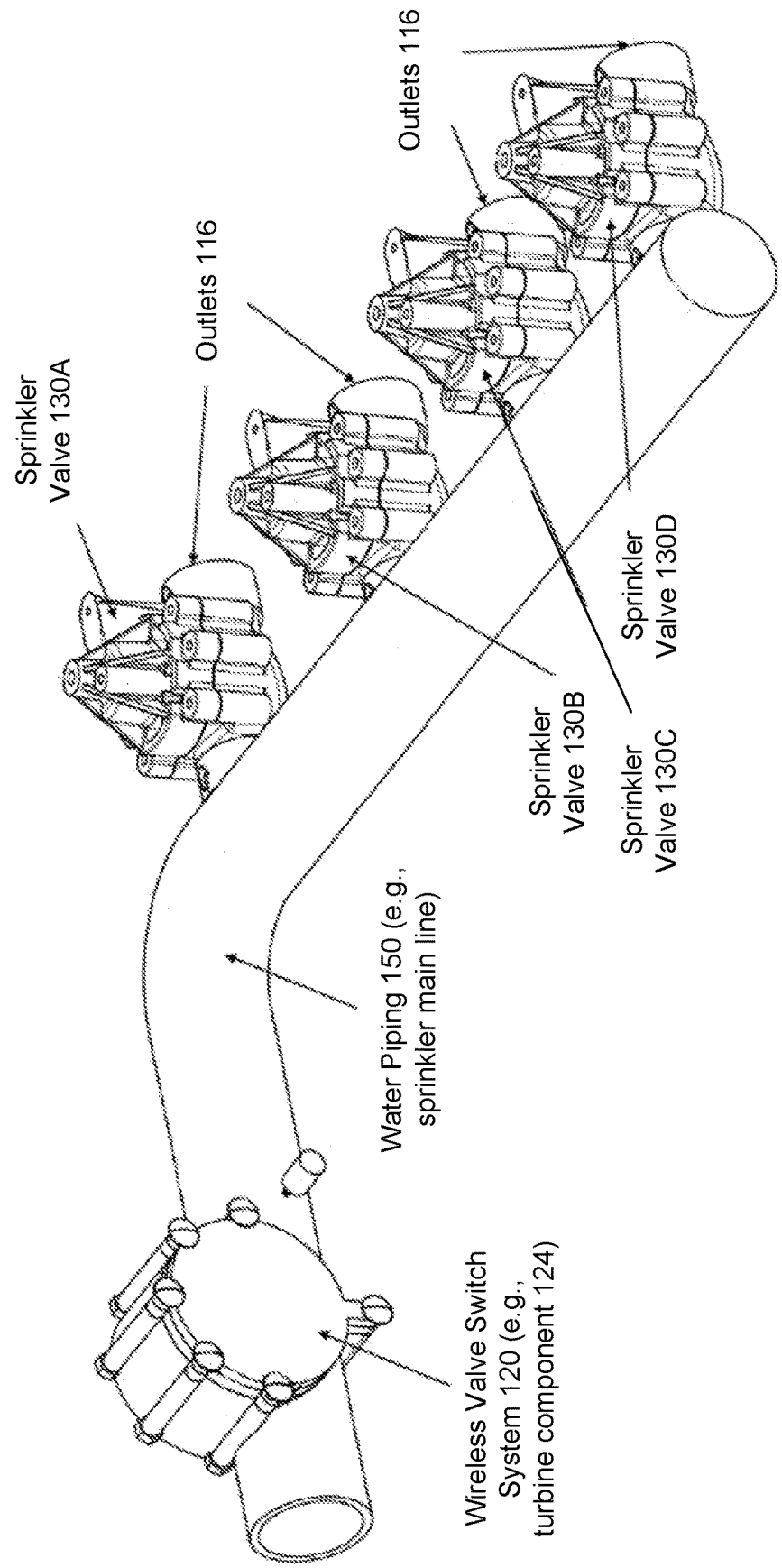
FIG. 4 illustrates a perspective view of a wireless sprinkler valve system, according to certain embodiments.

FIG. 4 depicts an example embodiment of a wireless sprinkler valve system 100 with a wireless valve switch system 120 (e.g., turbine component 124) attached to water piping 150 (e.g., a sprinkler main line), according to certain embodiments. The water piping 150 (e.g., sprinkler main line) may be fluidly coupled to one or more sprinkler valves 130 (e.g., attached to four sprinkler valves 130A-D). The sprinkler valves 130 have outlets 116 (e.g., valve outlets). Wireless valve switch system 120 is electrically connected to sprinkler valves 130 (e.g., via a wired connection). In some embodiments, wireless valve switch system 120 (e.g., wireless component 122) is located within a threshold distance from sprinkler valves 130 to reduce the amount of wiring to make the electrical connection. For example, in some embodiments, the wireless valve switch system 120 is located in a sprinkler box with the sprinkler valves 130.

In the wireless sprinkler valve system 100, water passing through the water piping 150 is also fluidly coupled to (e.g., sprinkler main line also passes through) the wireless valve switch system 120 (e.g., turbine component 124). Responsive to the sprinkler valves 130 being in a closed position, water may not pass through the wireless valve switch system 120 (e.g., turbine component 124). Responsive to at least one of the sprinkler valves 130 being in an open position, water passes through the wireless valve switch system 120 (e.g., turbine component 124). Wireless valve switch system 120 (e.g., wireless component 122) activates the valve switches 520 (e.g., see FIG. 5) in sprinkler valves 130 to open the sprinkler valves 130 and allow water to flow into the sprinkler system through outlets 116. In some embodiments, the sprinkler valve 130 is an electromechanical device (e.g., solenoid valve) and the valve switch 520 includes a solenoid. The solenoid may use an electric current (e.g., provided via the wireless valve switch system 120 from the power storage device 316) to generate electrical current to operate a mechanism that regulates the opening of fluid flow in the sprinkler valve 130. The solenoid valve may be used to shut off, release, dose, distribute, or mix fluid. The sprinkler valves 130 may be direct current (DC)-latching solenoids or AC solenoids (e.g., latches the valve open responsive to one signal and latches the valve closed responsive to another signal).

In some embodiments, the diameters of inlet 112 and outlet 116 of the wireless valve switch system 120 are sized to match a standard size water piping 150 (e.g., 0.5 to 2 inch diameter sprinkler line, up to 12 inch diameter sprinkler piping, or the like). This advantageously allows the wireless valve switch system 120 to be used with standard sprinkler systems without having to modify or adapt the connections between the wireless valve switch system 120 and the sprinkler line.

While FIG. 4 depicts four sprinkler valves 130 and one wireless valve switch system 120 (e.g., turbine component 124), any number of sprinkler valves 130 and wireless valve switch systems 120 could be used. For example, each sprinkler valve 130 could have its own wireless valve switch system 120. In some embodiments, a wireless valve switch system 120 is used to control six sprinkler valves 130.

The positioning of the wireless valve switch system 120 (e.g., turbine component 124) can also vary. For example, as shown, the wireless valve switch system 120 (e.g., turbine component 124) can be upstream from the sprinkler valves 130 and located on the water piping 150 (e.g., sprinkler mainline). In other embodiments, a wireless valve switch system 120 (e.g., turbine component 124) can be located directly before one or more of the sprinkler valves 130 (e.g., between the sprinkler valve 130 and the sprinkler main line). In some embodiments, the wireless valve switch system 120 (e.g., turbine component 124) is integral or in close proximity to the sprinkler valve 130. In still other embodiments, a wireless valve switch system 120 can be located downstream after one or more of the sprinkler valves 130.

Figure 5:
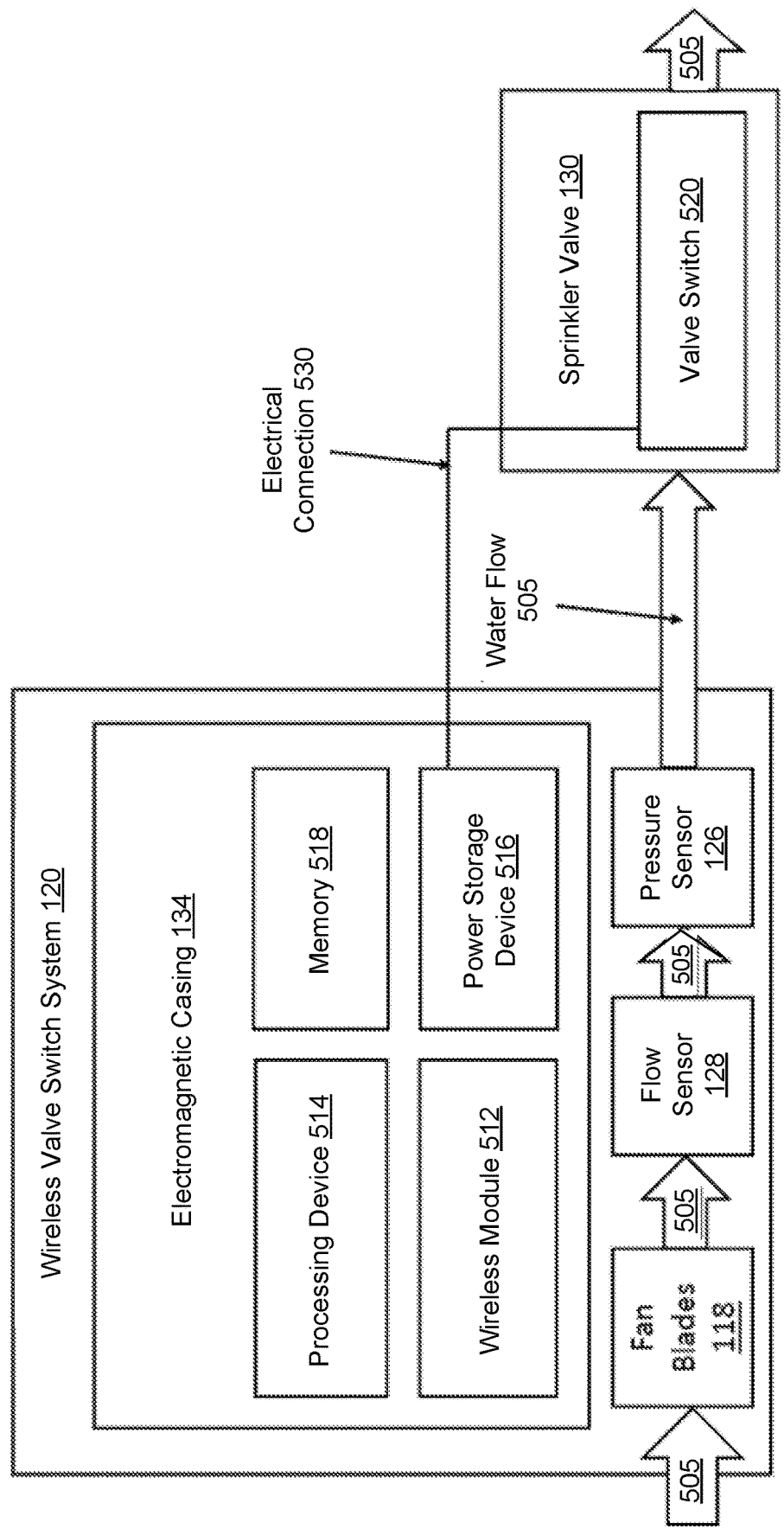
FIG. 5 illustrates a block diagram of a wireless sprinkler valve system, according to certain embodiments.

FIG. 5 illustrates a block diagram of a wireless sprinkler valve system 100, according to certain embodiments. The wireless sprinkler valve system 100 has a water flow 505 flowing through the wireless valve switch system 120 and to the sprinkler valve 130. Upon the water flow 505 entering the wireless valve switch system 120, the water flow 505 passes through the fan blades 118. In some embodiments, the water flow 505 also passes by the pressure sensor 126 and/or the flow sensor 128. The water flow 505 causes the fan blades 118 to spin, generating power, which is stored in the power storage device 516, located in the electromagnetic casing 134. The electromagnetic casing may include a flow meter reader 136. The pressure sensor 126 measures the pressure of the water flow 505 and the flow sensor 128 measures the flow rate of the water flow 505. The processing device 514 (e.g., controller, controller device) receives the pressure data from the pressure sensor 126 and flow rate data from flow sensor 128. The processing device 514 may store the pressure data and flow rate data in memory 518 (e.g., non-transitory computer-readable media). The memory 518 may be disposed in the electromagnetic casing 134. In some embodiments, data stored in the memory 518 can be accessed via the wireless module 512 (e.g., transmitter/receiver) by a user with a wireless device (e.g., user device 240 of FIG. 2).

The processing device 514 (e.g., disposed in the electromagnetic casing 134) may control when power is transferred from the power storage device 516, along the electrical connection 530 (e.g., wired connection, electrical wiring), to the sprinkler valve 130 and the valve switch 520. When the processing device 514 allows power to be transferred, valve switch 520 activates and opens or closes the sprinkler valve 130. When the sprinkler valve 130 is opened, water flow 505 is allowed to pass through the sprinkler valve 130 to the remainder of the sprinkler system (e.g., sprinkler heads 140). When the sprinkler valve 130 is closed, water is blocked from the remainder of the sprinkler system downstream from the sprinkler valve 130.

Processing device 514 also allows a control system 110 (e.g., user via sprinkler control box 210, wireless sprinkler control box 220, user device 240, a wireless device, etc.) to access the wireless sprinkler valve system 100 to allow a user to program settings (e.g., settings filed, schedule) of the wireless sprinkler valve system 100. In some embodiments, the settings control when the processing device 514 is to transfer power to the valve switch 520 and open or close the sprinkler valve 130. In some embodiments, the settings are stored in the memory 518. This advantageously allows a user to respond to changing weather conditions, such as turning off the sprinkler system when it is raining. In some embodiments, settings include date, time, occurrence of events, and detection of conditions based on weather or measured sensor data. In some embodiments, the wireless valve switch system 120 (e.g., wireless component 122) may receive current condition data (e.g., sensor data such as temperature data, rainfall data, humidity data, soil moisture level data, etc.) from a sensor (e.g., device 132) coupled to the wireless valve switch system 120 and may determine based on the current condition data and the settings (e.g., settings file, schedule) whether to actuate the sprinkler valve 130 and for how long to water the area (e.g., settings file or schedule may include rules of how long to water based on current condition data). In some embodiments, the forwarding device 212 relays (e.g., passes through) signals (e.g., from the sprinkler control box 210, from the cloud computing system 230, etc.).

In some embodiments, the processing device 514 is further configured to use data from the pressure sensor 126 and the flow sensor 128 to cause malfunctions in a sprinkler system fluidly coupled to the wireless sprinkler valve system 100 to be detected (e.g., by the processing device 514, by the control system 110). In some embodiments, the malfunctions are leaks, anomalies, or system changes in the sprinkler system. In some embodiments, the processing device 514 is also configured to transmit a notification or warning via the wireless module 512 (e.g., transmitter/receiver) to notify a user or a device. In some embodiments, the wireless module 512 communicates using hardware and a communication protocols, such as Bluetooth®, Wi-Fi®, a long-range wireless communication protocol (e.g., Long Range (LoRa)), or similar wireless technologies and standards. In some embodiments, the wireless module 512 includes a long range, low power wireless chipset (e.g., for providing a spread spectrum modulation technique derived from chirp spread spectrum (CSS) technology). In some embodiments, the wireless module 512 may transmit signals and receive signals up to half a mile, up to one mile, or longer distances.

FIGS. 6A-D illustrate methods 600A-D for operating a wireless sprinkler valve system 100, according to certain embodiments. The methods 600A-D can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 600A-D are performed by one or more of a control system 110 (e.g., control system 110 of one or more of FIG. 1, 2A, 2B, or 2C), a forwarding device 212 (e.g., forwarding device 212 of one or more of FIG. 2A or FIG. 2C), a wireless sprinkler control box 220 (e.g., of FIG. 2B), a cloud computing system 230 (e.g., of FIG. 2C), user device 240 (e.g., of FIG. 2C), processing device (e.g., processing device 514 of FIG. 5, controller, controller device, or the like), or a wireless valve switch system 120 (e.g., wireless component 122) (e.g., of one or more of FIG. 1, 3, 4, or 5). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 6A:
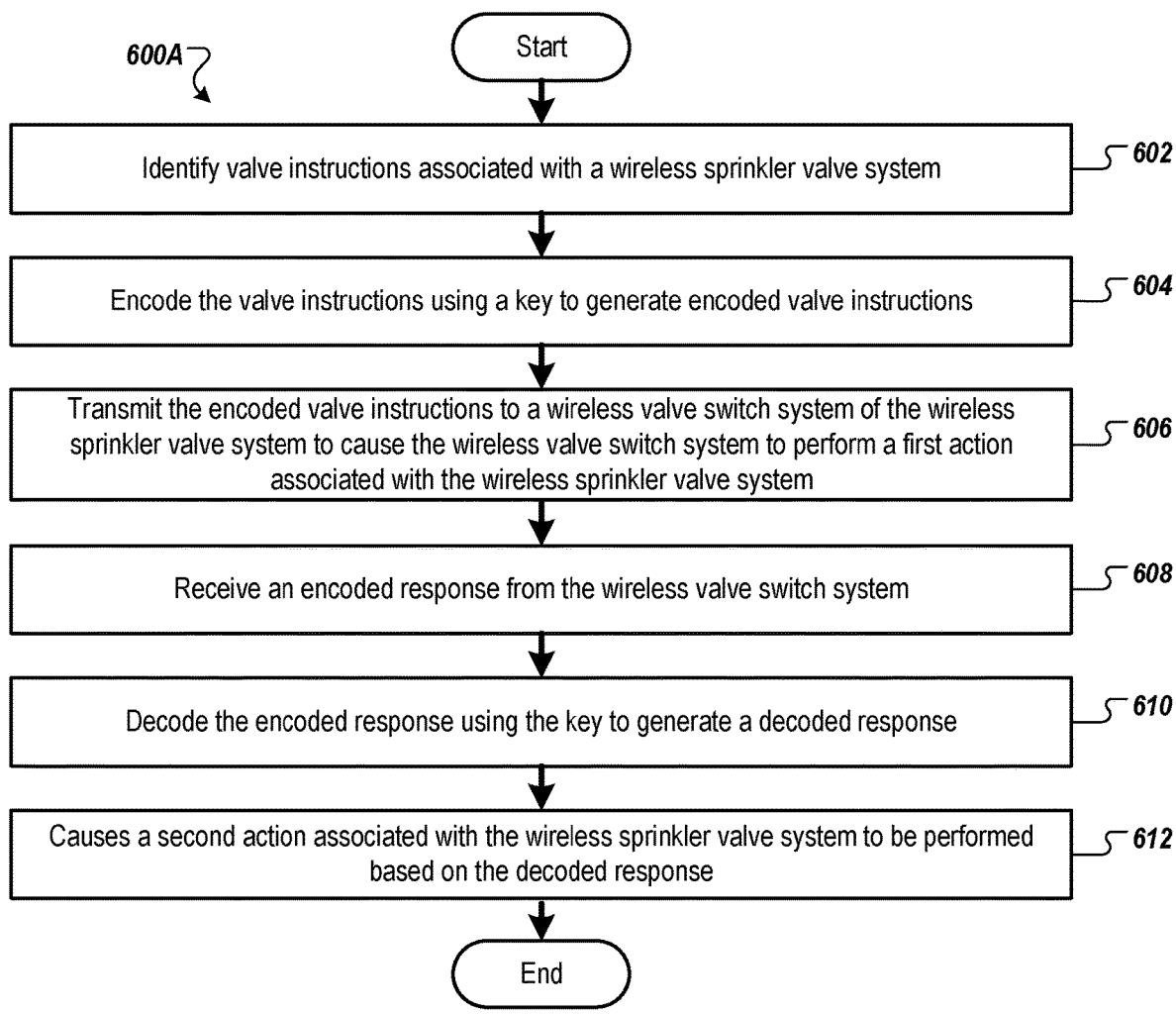
FIGS. 6A-D illustrate methods for operating a wireless sprinkler valve system, according to certain embodiments.

Referring to FIG. 6A, the method 600A may be performed by control system 110 (e.g., operations of method 600A may be performed by one or more of forwarding device 212, wireless sprinkler control box 220, cloud computing system 230, or user device 240).

At block 602, the processing logic identifies valve instructions. In some embodiments, the valve instructions are received based on user input. In some embodiments, the valve instructions are based on current condition data (e.g., weather information, calendar information, etc.). In some embodiments, the valve instructions are determined based on inputting the current condition data into a trained machine learning model and receiving output from the trained machine learning model indicative of valve instructions. In some embodiments, the valve instructions are determined based on a programmed schedule. In some embodiments, the valve instructions indicate one or more of a particular wireless valve switch device, a particular sprinkler valve, whether to turn on or off the sprinkler valve, an amount of time to turn on or off the sprinkler valve, etc. In some embodiments, the valve instructions indicate one or more requests for data (e.g., flow measurements, pressure measurements, temperature measurement, humidity measurement, rainfall measurement, soil moisture measurement, history of measurements, current schedule, battery level, etc.). In some embodiments, the valve instructions indicate an updated schedule. The updated schedule may indicate which sprinkler valves the wireless valve switch device is to actuate at which times.

At block 604, the processing logic encodes the valve instructions using a key to generate encoded valve instructions. The control system 110 (e.g., that includes the processing logic) and the wireless valve switch device may have been previously configured through exchanging of keys (e.g., commissioned, a handshake, etc.). In some embodiments, the control system 110 and the wireless valve switch system 120 are set to a pairing setting for exchanging of keys. For example, both devices may receive user input (e.g., turning of a dial) to indicate that both devices are open to pairing. Both devices may be set to a certain identifier (e.g., by turning of the respective dials to the same identifier). Both devices may transmit (e.g., broadcast, multicast) a signal (e.g., including the identifier) and may receive each other's signal. Upon receiving each other's signals (e.g., including the same identifier), the two devices may exchange keys. One or more of the control system 110 or the wireless valve switch system 120 may provide an alert (e.g., flashing light emitting diodes (LED), etc.) indicating that the control system 110 and the wireless valve switch system 120 have been paired. The control system 110 and the wireless valve switch system 120 may store the exchanged keys in non-volatile memory. The control system 110 may store (e.g., in non-volatile memory) the exchanged keys for each of the wireless valve switch systems 120 (e.g., wireless valve switch devices, wireless components 122) that are paired with the control system 110

At block 606, the processing logic transmits the encoded valve instructions to the wireless valve switch system 120. In some embodiments, the processing logic may continue transmitting the encoded valve instructions (e.g., periodically) until the processing logic receives a response from the wireless valve switch system 120 (e.g., indicating the valve instructions were received, indicating the sprinkler valve was actuated, indicating the requested data, etc.). The processing logic may transmit the encoded valve instructions to cause the wireless valve switch system 120 to perform a first action associated with the wireless sprinkler valve system 100.

In some embodiments, the first action is to actuate one or more sprinkler valves 130 (e.g., at a set time, for a set duration, etc.). In some embodiments, the first action is to update a schedule stored by the wireless valve switch system 120 for actuating the one or more sprinkler valves 130. In some embodiments, the first action is to retrieve data (e.g., flow measurements, quantity measurements, pressure measurements, temperature measurement, humidity measurement, rainfall measurement, soil moisture measurement, history of measurements, current schedule, battery level, etc.).

At block 608, the processing logic receives an encoded response from the wireless valve switch system 120. The encoded response may be in response to the encoded valve instructions. The encoded response may have been encoded by the wireless valve switch system 120 using the key.

At block 610, the processing logic decodes the encoded response using the key to generate a decoded response. In some embodiments, the decoded response indicates that the wireless valve switch system 120 caused the sprinkler valve 130 to actuate. In some embodiments, the decoded response includes the requested data (e.g., flow measurements, pressure measurements, temperature measurement, humidity measurement, rainfall measurement, soil moisture measurement, history of measurements, current schedule, battery level, etc.). In some embodiments, the decoded response indicates that the current schedule has been updated by the updated schedule.

At block 612, the processing logic causes an action to be performed (e.g., performs the action) based on the decoded response. In some embodiments, the processing logic stops sending the valve instructions based on a decoded response (e.g., indicating the wireless valve switch system 120 caused the sprinkler valve 130 to actuate, the requested data, etc.). In some embodiments, the processing logic provides an alert based on the decoded response (e.g., quantity of water used, drop in pressure or possible leak, replace battery, change schedule, etc.). In some embodiments, the processing logic changes the schedule based on the decoded response (e.g., adjust sprinkler run time based on rainfall, temperature, humidity, soil moisture measurement, water usage, or the like). In some embodiments, the processing logic compares the data received in the decoded response to one or more thresholds (e.g., threshold water usage, threshold soil moisture, threshold pressure, etc.) to determine whether to provide an alert and/or change the schedule. For example, responsive to determining a pressure (e.g., determined based on pressure data received in the decoded response) meets a threshold pressure (e.g., below 30 psi), the processing logic may provide an alert (e.g., via a GUI) indicating a potential water leak in the wireless sprinkler valve system 100.

In some embodiments, a device (e.g., flow, pressure or moisture sensor) is coupled to the wireless valve switch system 120 via a wired connection. The device transmits sensor data to the wireless valve switch system 120 and the wireless valve switch system transmits the sensor data to the processing device. For example, the wireless valve switch system 120 may transmit the sensor data to the forwarding device 212 via a wireless network and the forwarding device 212 may transmit the sensor data to the sprinkler control box 210 via a wired connection. The sprinkler control box may compare programmed site conditions against the sensor data and then take corrective action accordingly. In some embodiments, responsive to determining a catastrophic mainline failure based on the sensor data, the control system 110 transmits instructions for a master valve (e.g., a valve that shuts off water to the entire sprinkler system or to one or more wireless valve switch systems 120) to be placed in a closed position. The master valve might be wired directly to the control system 110 or via a wireless valve switch system 120. If communicating through the wireless valve switch system 120, an "Off" command would be sent by the sprinkler control box 210 to the forwarding device 212 and from the forwarding device 212 to the wireless valve switch system 120 and from the wireless valve switch system 120 to the corresponding master valve to place the master valve in a closed position. The master valve would remain in the closed position until reset at the control system 110.

Figure 6B:
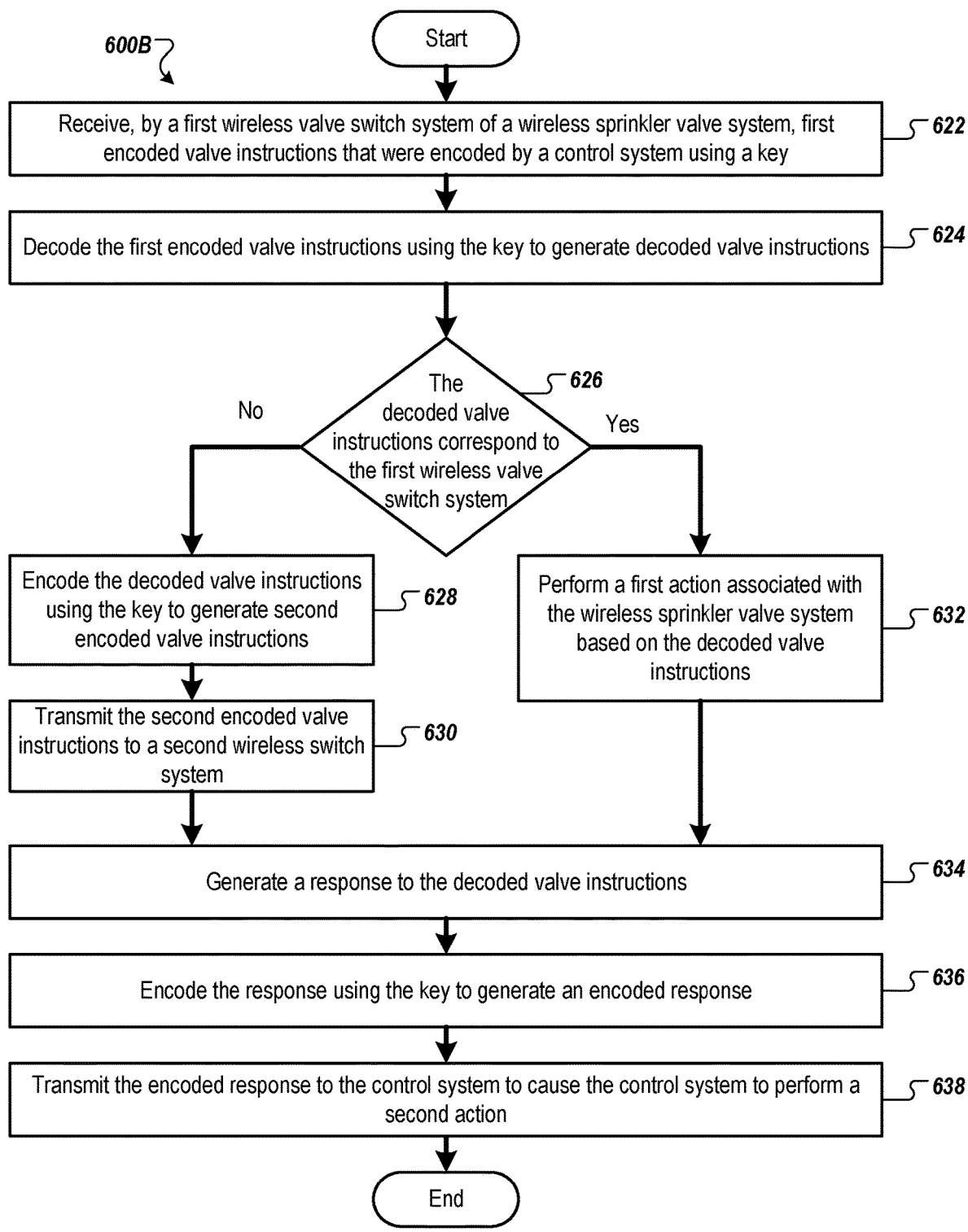

Referring to FIG. 6B, the method 600B may be performed by wireless valve switch system 120 (e.g., processing device 514 of wireless valve switch system 120, processing device 514 of wireless component 122).

At block 622, the processing logic receives encoded valve instructions. The encoded valve instructions may have been encoded by the control system 110 using a key. Keys may have been interchanged between the processing logic and the control system (e.g., during commissioning, during setup, during handshake, etc.). The keys may have been interchanged similar to as described in block 604.

At block 624, the processing logic decodes the encoded valve instructions to generate decoded valve instructions. The valve instructions may indicate a particular wireless valve switch device. In some embodiments, the decoded valve instructions are based on user input and/or a programmed schedule. In some embodiments, the valve instructions indicate one or more of a particular sprinkler valve, whether to turn on or off the sprinkler valve, an amount of time to turn on or off the sprinkler valve, etc. In some embodiments, the valve instructions indicate one or more of a request for data (e.g., flow measurements, pressure measurements, temperature measurement, humidity measurement, rainfall measurement, soil moisture measurement, history of measurements, current schedule, battery level, etc.). In some embodiments, the valve instructions indicate an updated schedule. The updated schedule may indicate which sprinkler valves the wireless valve switch device is to actuate at which times.

At block 628, the processing logic determines whether the decoded valve instructions correspond to the wireless valve switch device that corresponds to the processing logic or to a different wireless valve switch device. Responsive to determining the decoded valve instructions correspond to a different wireless valve switch, flow continues to block 626. Responsive to determining the decoded valve instructions correspond to the wireless valve switch that corresponds to the wireless processing logic, flow continues to block 630.

At block 628, the processing logic encodes the decoded valve instructions using the key to generate encoded valve instructions.

At block 630, the processing logic transmits the encoded valve instructions. The wireless valve switch system 120 (e.g., wireless valve switch devices, wireless component 122) in the wireless sprinkler valve system 100 may act as relays so that valving instructions can reach a distance that is greater than the maximum communication distance of which the control system 110 is capable (e.g., if the control system 110 can communicate half of a mile distance, the control system 110 can communicate to a wireless valve switch system 120A that is up to 0.5 miles away and the wireless valve switch system 120A may communicate to a wireless valve switch system 120B that is up to another 0.5 miles away).

At block 632, the processing logic performs an action based on the decoded valve instructions. In some embodiments, the processing logic actuates a sprinkler valve 130 based on the decoded valve instructions. In some embodiments, the processing logic identifies data requested by the decoded valve instructions. In some embodiments, the processing logic updates a schedule based on the decoded valve instructions. In some embodiments, the processing logic (e.g., of the wireless valve switch system 120) may perform certain actions (e.g., actuate one or more sprinkler valves at certain times, store measurements, send measurements, etc.) based on the schedule. The wireless valve switch system 120 may deviate from the schedule responsive to receiving encoded valve instructions from the control system 110. The processing logic may receive measurements from one or more sensors (e.g., flow sensor 128, pressure sensor 126, temperature sensor, humidity sensor, rainfall sensor, soil moisture sensor, etc.). The processing logic may deviate from the schedule based on one or more measurements meeting a threshold value (e.g., rainfall measurement meeting a threshold measurement value, soil moisture measurement meeting a threshold measurement value, etc.).

At block 634, the processing logic generates a response to the decoded valve instructions. In some embodiments, the response may indicate that the valve instructions were re-encoded and transmitted to a different wireless valve switch device. In some embodiments, the response indicates an action was performed (e.g., sprinkler valve was actuated) based on the valve instructions. In some embodiments, the response indicates data (e.g., measurements, etc.) requested by the valve instructions.

At block 636, the processing logic encodes the response using the key to generate an encoded response.

At block 638, the processing logic transmits the encoded response to the control system 110 to cause the control system to perform an action (e.g., see block 612).

Figure 6C:
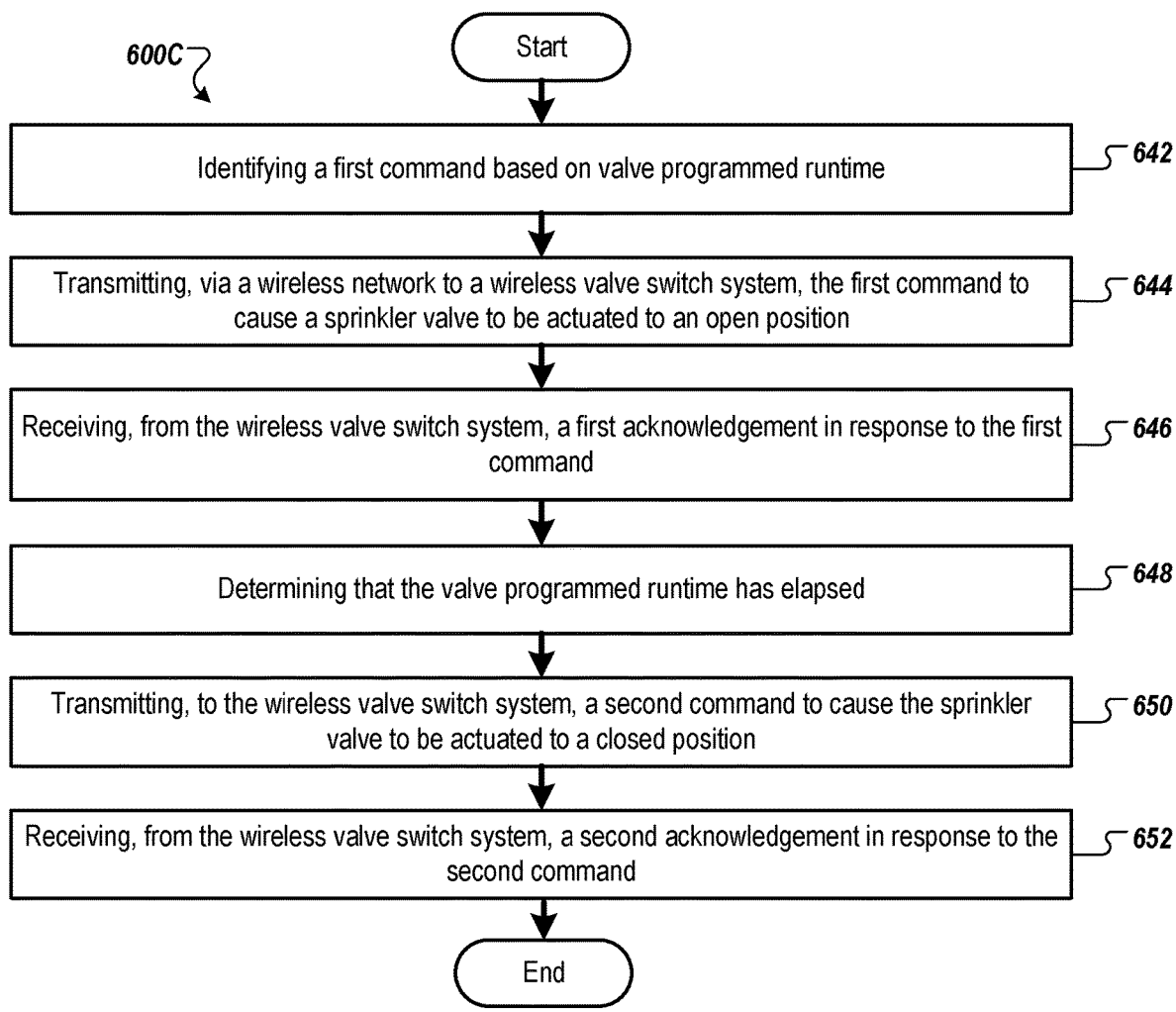

Referring to FIG. 6C, the method 600C may be performed by control system 110 (e.g., operations of method 600C may be performed by one or more of forwarding device 212, wireless sprinkler control box 220, cloud computing system 230, or user device 240).

At block 642, the processing logic identifies a first command based on valve programmed runtime. For example, processing logic of the forwarding device 212 may receive the first command from the sprinkler control box 210 via a wired connection. In some embodiments, the sprinkler control box 210 sends a valve signal (e.g., a 24 VAC "on" command) to actuate a remote control valve (e.g., sprinkler valve 130) to a specific station output (e.g., on) and the forwarding device 212 receives the valve signal.

At block 644, the processing logic transmits, via a wireless network to a wireless valve switch system 120, the first command to cause a sprinkler valve to be actuated to an open position. In some embodiments, the forwarding device 212 sends the valve signal (e.g., "on command") to the wireless valve switch system 120 to actuate the corresponding sprinkler valve 130 in the field.

At block 646, the processing logic receives, from the wireless valve switch system, a first acknowledgement in response to the first command. In some embodiments, the wireless valve switch system 120 decodes the inbound message (e.g., valve signal) and sends the first acknowledgement (e.g., a decoder acknowledgement command) back to the forwarding device 212.

At block 648, the processing logic determines that the valve programmed runtime has elapsed. For example, the processing logic of the forwarding device 212 may cease to receive the first command from the sprinkler control box responsive to the valve programmed runtime elapsing.

At block 650, the processing logic transmits, to the wireless valve switch system, a second command to cause the sprinkler valve to be actuated to a closed position. In some embodiments, when the programmed runtime of the station has elapsed, the valve signal to the forwarding device 212 ceases and the forwarding device 212 sends a decoder message to the wireless valve switch system 120.

At block 652, the processing logic receives, from the wireless valve switch system, a second acknowledgement in response to the second command. In some embodiments, the wireless valve switch system 120 decodes the inbound message and sends a decoder acknowledgement command back to the forwarding device 212. The wireless valve switch system 120 sends an "off" message to the sprinkler valve 130 to close and cease irrigation.

Figure 6D:
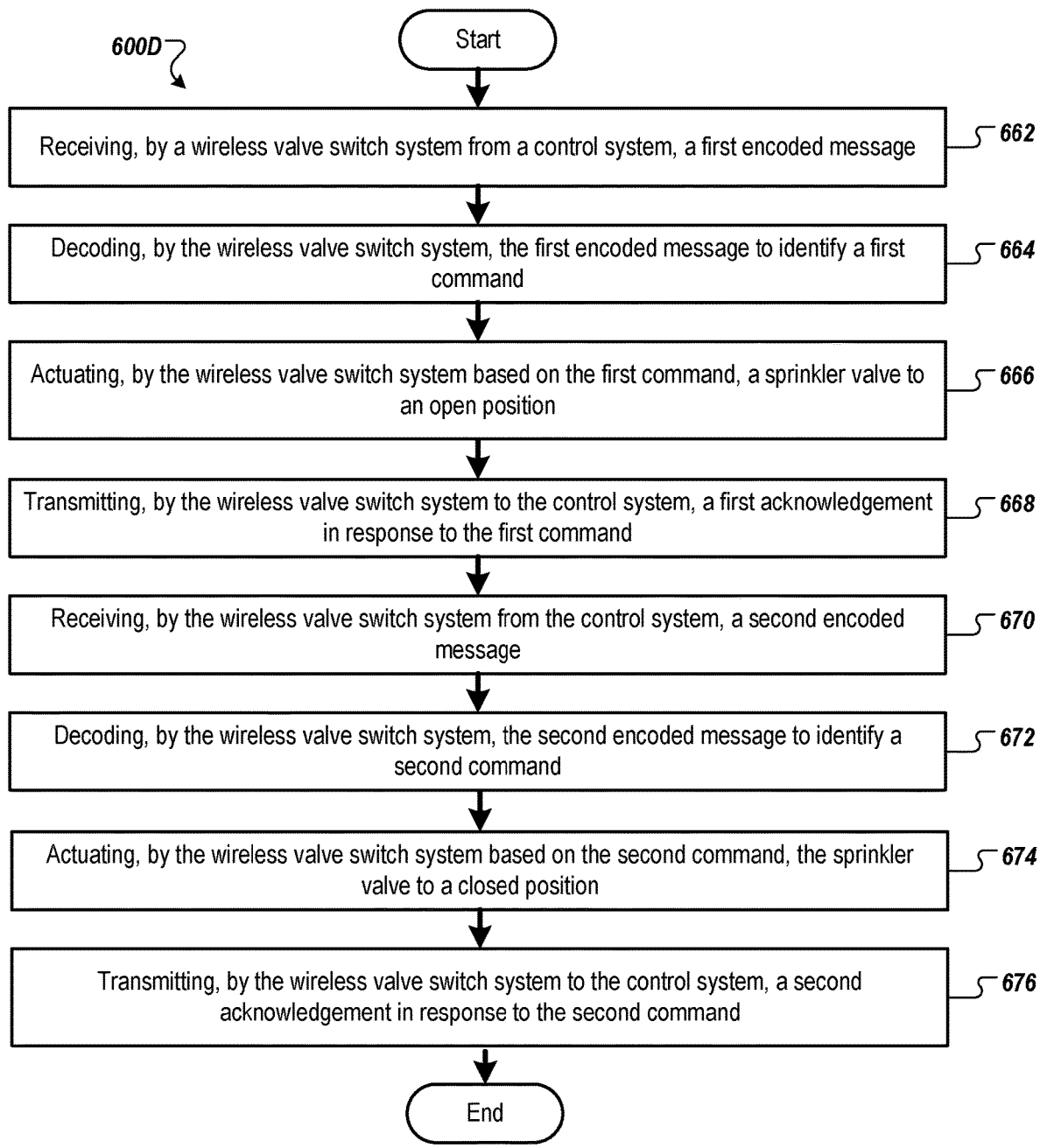

Referring to FIG. 6D, the method 600D may be performed by wireless valve switch system 120 (e.g., processing device 314 of wireless valve switch system 120, processing device 314 of wireless component 122).

At block 662, the processing logic receives, from a control system, a first encoded message. In some embodiments, the first encoded message is an "on" command received by the forwarding device 212 from a sprinkler control box 210 and relayed by the forwarding device 212 to the processing logic of the wireless valve switch system 120.

At block 664, the processing logic decodes the first encoded message to identify a first command. For example, the first command may be an "on" command. In some embodiments, the processing logic periodically receives the "on" command (e.g., via periodically receiving the first encoded message) while the sprinkler valve 130 is to be actuated to the open position.

At block 666, the processing logic actuates, based on the first command, a sprinkler valve 130 to an open position. In some embodiments, the processing logic relays the "on" command to the sprinkler valve 130 that was sent by the sprinkler control box 210 to the forwarding device 212 and from the forwarding device 212 to the wireless valve switch system 120 (e.g., as if the sprinkler control box 210 were to directly send the "on" command to the sprinkler valve 130).

At block 668, the processing logic transmits, to the control system, a first acknowledgement in response to the first command (e.g., responsive to one or more of receiving the first encoded message, decoding the first command, actuating the sprinkler valve to the open position, or the like).

At block 670, the processing logic receives, from the control system, a second encoded message. The processing logic may receive the second encoded message from the forwarding device 212 responsive to the programmed runtime of the station elapsing (e.g., the forwarding device 212 ceasing to receive a valve signal from the sprinkler control box 210).

At block 672, the processing logic decodes the second encoded message to identify a second command. In some embodiments, the second command is an "off" command. In some embodiments, responsive to one or more of the processing logic and/or the forwarding device 212 not receiving an "on" command for a threshold amount of time from the sprinkler control box 210, the processing logic and/or forwarding device 212 is to send an "off" command to the sprinkler valve 130 (e.g., to avoid overwatering responsive to connection being lost).

At block 674, the processing logic actuates, based on the second command, the sprinkler valve to a closed position.

At block 676, the processing logic transmits, to the control system, a second acknowledgement in response to the second command (e.g., responsive to one or more of receiving the second encoded message, decoding the second command, actuating the sprinkler valve to the closed position, or the like).

Figure 7:
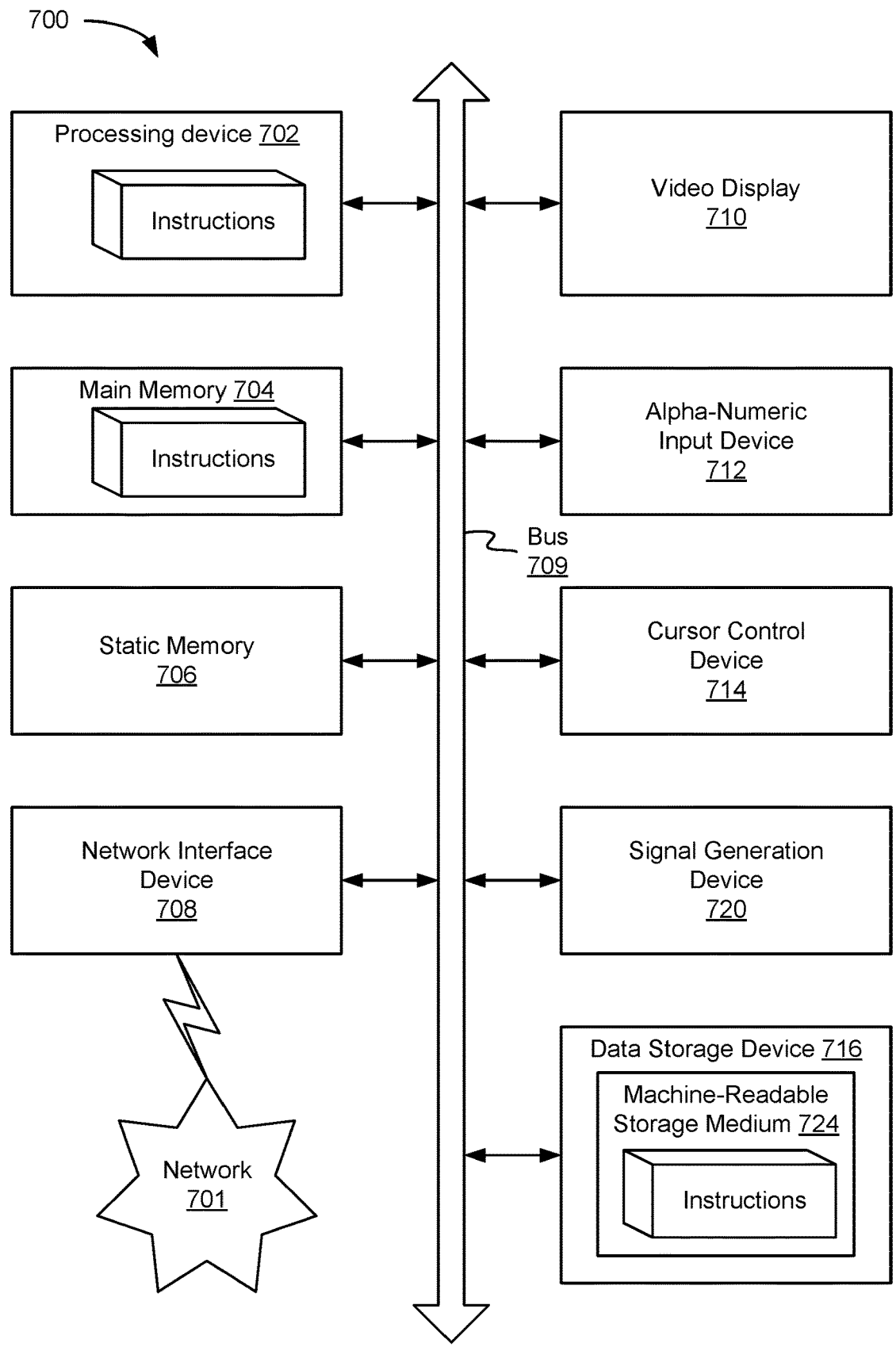
FIG. 7 illustrates a diagrammatic representation of a machine in the example form of a computer system including a set of instructions executable by a computer system to operate a wireless sprinkler valve system according to any one or more of the methodologies discussed herein.

FIG. 7 illustrates a diagrammatic representation of a machine in the example form of a computer system including a set of instructions executable by a computer system 700 to control a wireless sprinkler valve system 100 according to any one or more of the methodologies discussed herein. In some embodiments, computer system 700 is a control system 110 (e.g., control system 110 of one or more of FIG. 1, 2A, 2B, or 2C). In some embodiments, computer system 700 is a forwarding device 212 (e.g., forwarding device 212 of one or more of FIG. 2A or FIG. 2C). In some embodiments, computer system 700 is a wireless sprinkler control box 220 (e.g., of FIG. 2B). In some embodiments, computer system 700 is a cloud computing system 230 (e.g., of FIG. 2C). In some embodiments, computer system 700 is a user device 240 (e.g., of FIG. 2C). In some embodiments, computer system 700 is a wireless valve switch system 120 (e.g., of one or more of FIG. 1, 3, 4, or 5). The computer system 700 may have more or less components than those shown in FIG. 7 (e.g., wireless valve switch system 120 may have fewer components than shown in computer system 700). In one embodiment, the computer system 700 may include instructions to enable execution of the processes and corresponding components shown and described in connection with FIGS. 1-6B.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702 (e.g., processor, processing device 514 of FIG. 5), a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 709.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. In various implementations of the present disclosure, the processing device 702 is configured to execute instructions for performing the operations and processes described herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable storage medium 728 (or machine-readable medium) on which is stored one or more sets of instructions embodying any one or more of the methodologies or functions described herein. The instructions may also reside, completely or at least partially, within the main memory 704 and/or within processing logic 726 of the processing device 702 during execution thereof by the computer system 700, the main memory 704 and the processing device 702 also constituting computer-readable media.

The instructions may further be transmitted or received over a network 701 via the network interface device 708. While the computer-readable storage medium 728 is shown in an example embodiment to be a single medium, the term "non-transitory computer-readable storage medium" should be taken to include a single medium or multiple media (e.g., a centralized or distributed database, and/or associated caches and servers) that store the one or more sets of instructions. The term "non-transitory computer-readable storage medium" shall also be taken to include any medium that is capable of storing, encoding or carrying a set of instructions for execution by the machine and that cause the machine to perform any one or more of the methodologies of the present disclosure. The term "non-transitory computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "coupling, "charging," "executing," "transferring," "opening," "closing," "storing," "detecting," "receiving," "transmitting," "identifying," "encoding," "decoding," "performing," "determining," "generating," "updating," "configuring," "causing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by a wireless component of a wireless device via a wireless network, one or more wireless instructions, wherein the wireless device comprises a device housing forming a chamber, the wireless component being disposed in the device housing, and a turbine being disposed in the chamber; and
causing, by the wireless component based on the one or more wireless instructions, actuation of a plurality of sprinkler valves that are electrically coupled to the wireless component.

2. The method of claim 1 further comprising:
transmitting, by the wireless component via the wireless network, sensor data associated with one or more components coupled to the wireless device.

3. The method of claim 1, wherein the turbine is electrically coupled to the wireless component, wherein the plurality of sprinkler valves are fluidly coupled to the chamber, wherein fluid flow is to be provided through the chamber to at least one sprinkler valve of the plurality of sprinkler valves responsive to the at least one sprinkler valve being in an open position, and wherein the turbine is configured to rotate responsive to the fluid flow through the chamber to power the wireless component.

4. The method of claim 1, wherein the causing of the actuation of the plurality of sprinkler valves comprises:
charging, by the turbine, an energy storage device of the wireless component responsive to rotation of the turbine; and
executing, by a controller of the wireless component, the one or more wireless instructions to transfer power from the energy storage device to the plurality of sprinkler valves to actuate the plurality of sprinkler valves.

5. The method of claim 3, wherein:
the device housing further comprises an inlet and an outlet;
the turbine is disposed within the chamber between the inlet and the outlet; and
the inlet is configured to receive the fluid flow and the outlet is configured to provide the fluid flow to the at least one sprinkler valve of the plurality of sprinkler valves responsive to the at least one sprinkler valve being in the open position.

6. The method of claim 1, wherein:
the one or more wireless instructions comprise first wireless instructions and second wireless instructions;
the plurality of sprinkler valves comprises a first sprinkler valve and a second sprinkler valve; and
the causing of the actuation of the plurality of sprinkler valves comprises causing first actuation of the first sprinkler valve based on the first wireless instructions and causing second actuation of the second sprinkler valve based on the second wireless instructions.

7. A wireless device comprising:
a device housing forming a chamber, wherein a turbine is disposed in the chamber; and
a wireless component disposed in the device housing and coupled to the turbine, the wireless component being configured to be electrically coupled to a plurality of sprinkler valves, wherein the wireless component comprises:
computer-readable media; and
a controller coupled to the computer-readable media, wherein the controller is to:
receive, via a wireless network, one or more wireless instructions; and
cause, based on the one or more wireless instructions, actuation of the plurality of sprinkler valves.

8. The wireless device valve switch system of claim 7, wherein the controller is further to:
receive sensor data from one or more electrical components; and
transmit the sensor data via the wireless network.

9. The wireless device of claim 7, wherein:
the turbine is electrically coupled to the wireless component;
the chamber is configured to be fluidly coupled to the plurality of sprinkler valves, wherein fluid flow is to be provided through the chamber to at least one sprinkler valve of the plurality of sprinkler valves responsive to the at least one sprinkler valve being in an open position; and
the turbine is configured to rotate responsive to the fluid flow through the chamber to power the wireless component.

10. The wireless device of claim 7, wherein:
the one or more wireless instructions comprise first wireless instructions and second wireless instructions;
the plurality of sprinkler valves comprises a first sprinkler valve and a second sprinkler valve; and
to cause the actuation of the plurality of sprinkler valves, the controller is to cause first actuation of the first sprinkler valve based on the first wireless instructions and cause second actuation of the second sprinkler valve based on the second wireless instructions.

11. A wireless device comprising:
a device housing forming a chamber configured to be fluidly coupled to a plurality of sprinkler valves; and
a turbine disposed in the chamber, wherein the turbine is configured to rotate responsive to fluid flow through the chamber to power a wireless component that is disposed in the device housing and that is configured to be electrically coupled to the plurality of sprinkler valves, wherein the wireless component is configured to cause actuation of the plurality of sprinkler valves.

12. The wireless device of claim 11, wherein:
the device housing comprises an inlet and an outlet;
the turbine is disposed within the chamber between the inlet and the outlet; and
the inlet is configured to receive the fluid flow and the outlet is configured to provide the fluid flow to at least one sprinkler valve of the plurality of sprinkler valves responsive to the at least one sprinkler valve being in an open position.

13. The wireless device of claim 12, wherein:
an inside surface of the outlet is configured to couple to first piping of a first diameter;
an outside surface of the outlet is configured to couple to second piping of a second diameter that is different than the first diameter; and
a threaded union is disposed between the outlet and the chamber.

14. The wireless device of claim 11, wherein the wireless component comprises:
computer-readable media; and
a controller coupled to the computer-readable media, wherein the controller is to:
receive, via a wireless network, one or more wireless instructions;
cause, based on the one or more wireless instructions, actuation of the plurality of sprinkler valves; and
responsive to receiving sensor data, transmit the sensor data via the wireless network.

15. The wireless device of claim 14, wherein:
the chamber is configured to be fluidly coupled to the plurality of sprinkler valves comprising a first sprinkler valve and a second sprinkler valve;
the one or more wireless instructions comprise first wireless instructions and second wireless instructions; and
to cause the actuation of the plurality of sprinkler valves, the controller is to cause first actuation of the first sprinkler valve based on the first wireless instructions and cause second actuation of the second sprinkler valve based on the second wireless instructions.

* * * * *